United States Patent

[11] 3,601,858

[72] Inventor Hubert Blanchard
Le Havre, France
[21] Appl. No. 6,757
[22] Filed Jan. 29, 1970
[45] Patented Aug. 31, 1971
[73] Assignee Sidel, Societe Anonyme
Le Havre, France
[32] Priority Feb. 5, 1969
[33] France
[31] 69 02576

[54] EXTRUDING-BLOWING MACHINE FOR MAKING HOLLOW PLASTIC ARTICLES
16 Claims, 29 Drawing Figs.

[52] U.S. Cl. .................................................. 18/5 BP,
18/5 BB, 18/20 B
[51] Int. Cl. .................................................. B29c 05/06
[50] Field of Search .......................................... 18/5 BP, 5
BM, 5 BB, 20 B, 20R

[56] References Cited
UNITED STATES PATENTS
2,285,150  6/1942  Ferngren .................. 18/5 BP
2,579,399  12/1951  Ruekberg .................. 18/5 BP
2,750,624  6/1956  Coates et al. .............. 18/5
2,784,452  3/1957  Ruekberg et al. ........... 18/5 BP Primary Examiner—J. Spencer Overholser
Assistant Examiner—Norman E. Lehrer
Attorneys—Robert E. Burns and Emmanuel J. Lobato ABSTRACT: A machine for manufacturing plastic hollow bodies by extrusion-blowing, which comprises an extruder adapted to produce a continuous tubular blank or parison delivered in a vertical direction and a plurality of molds disposed at spaced intervals about the axis of rotation of a rotatable shaft. This machine is characterized in that it comprises double-acting longitudinal pneumatic actuators of the cylinder-and-piston unit type, carried by the support of the molds, an opening ramp and a closing ramp carried by a fixed transverse plate and extending along circular arcs centered to said axis of rotation, and rollers carried by the rear ends of the rods of said pneumatic actuators, said rollers engaging said opening and closing ramps.

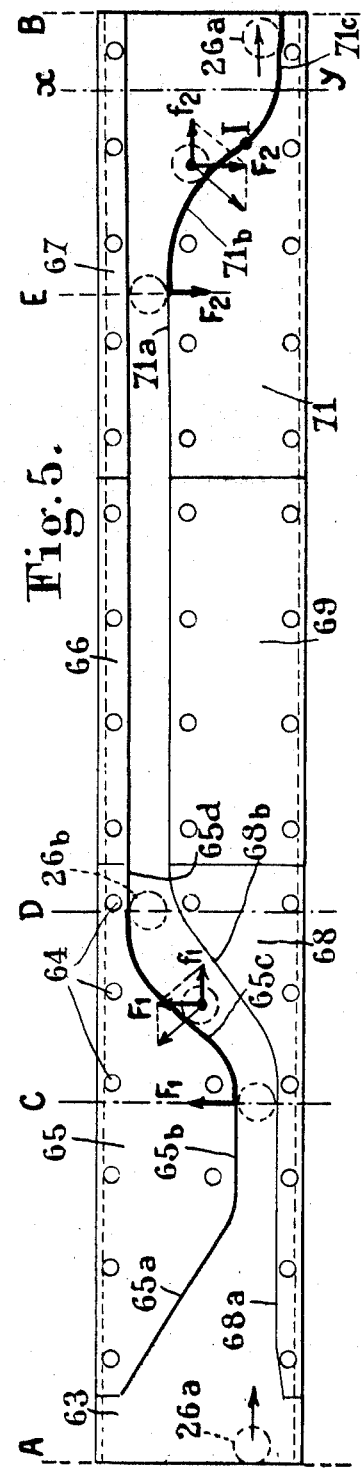
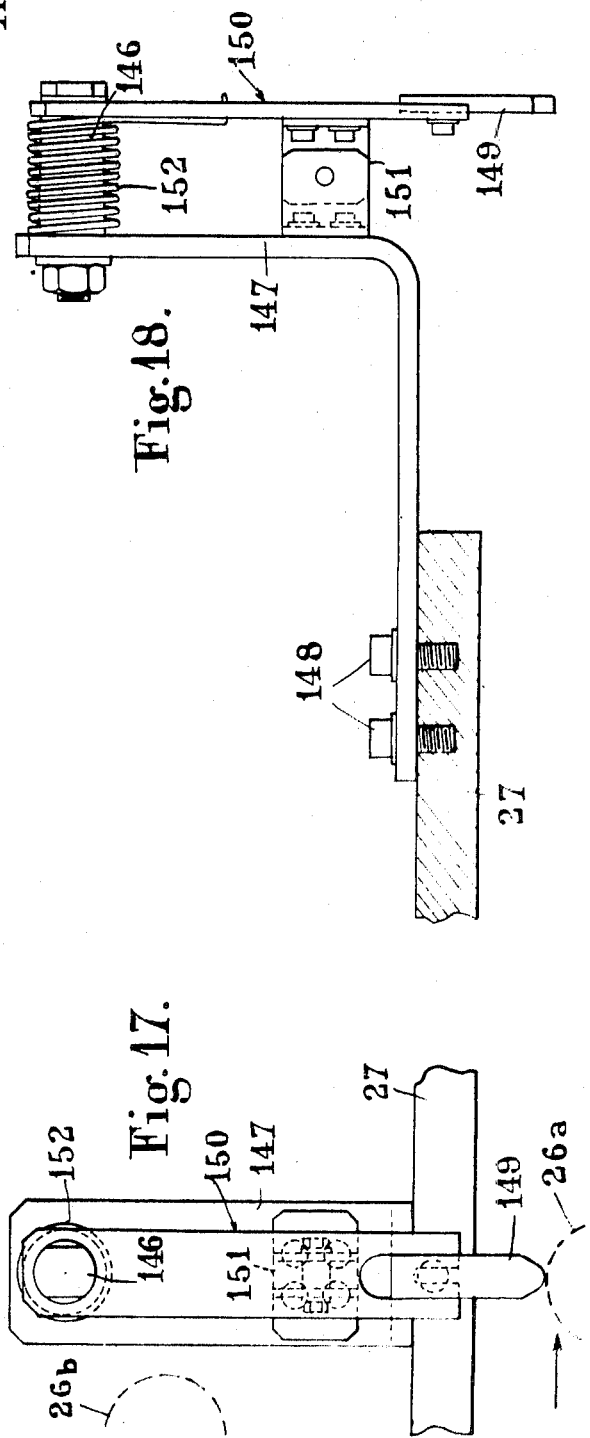

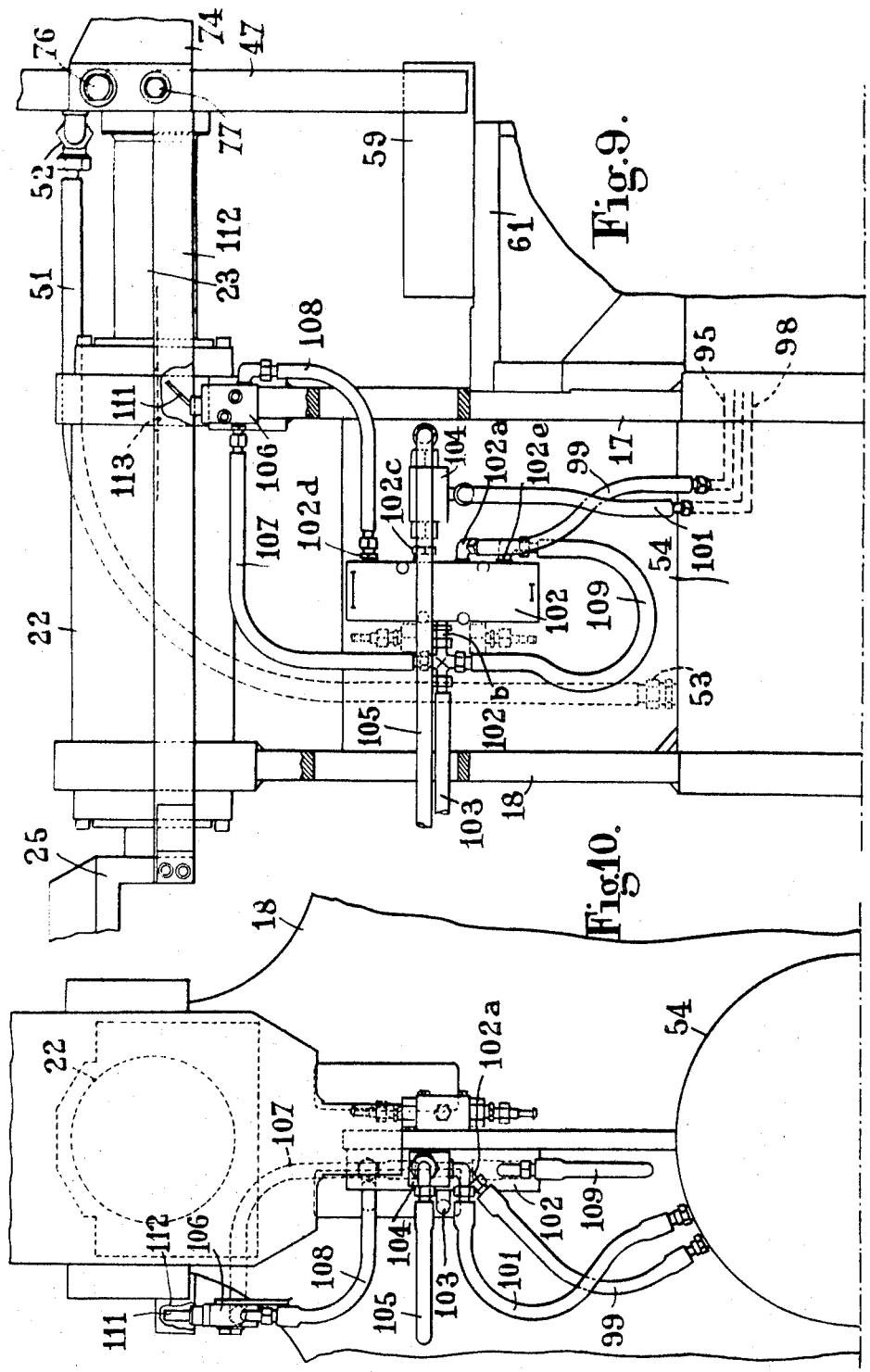

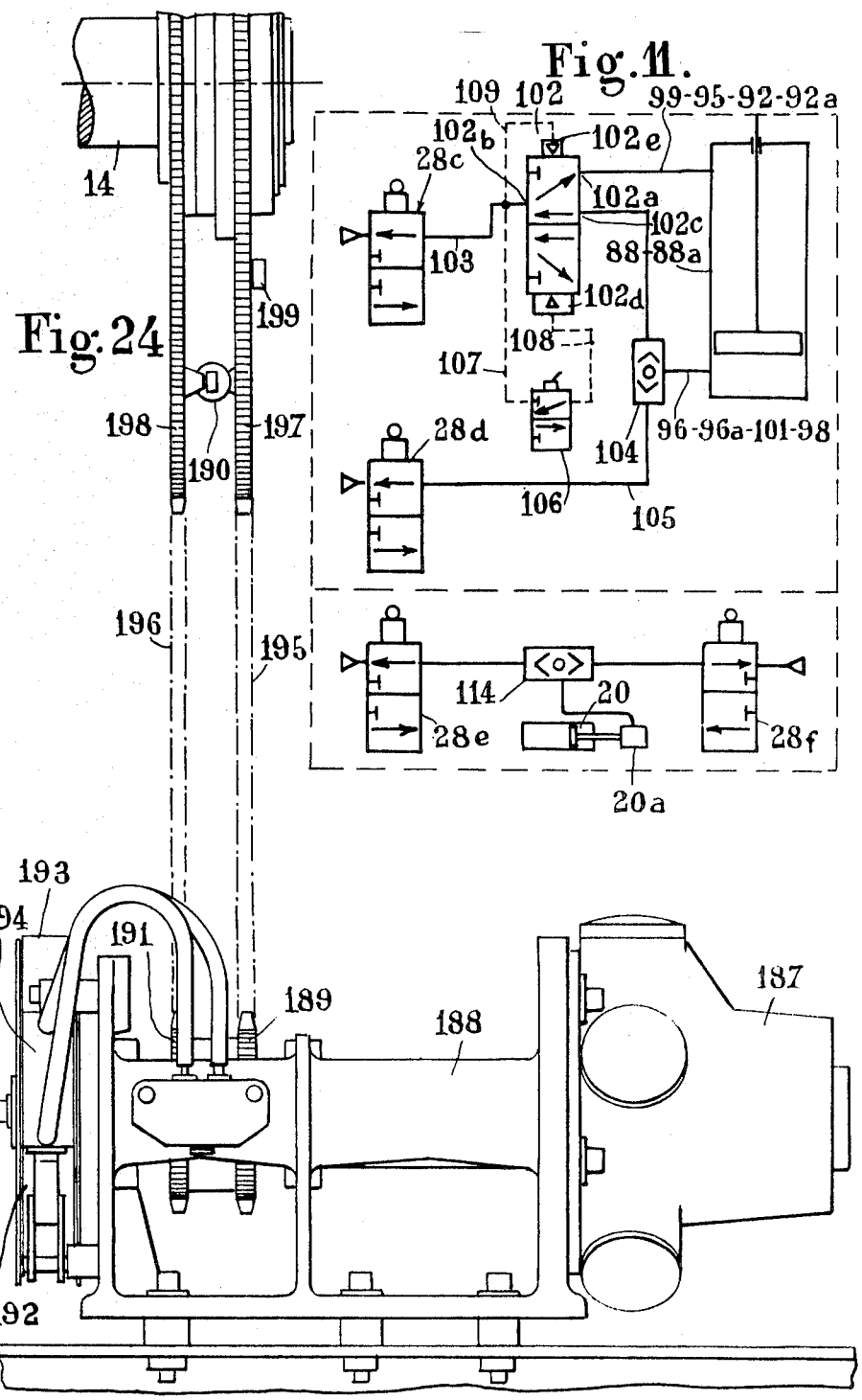

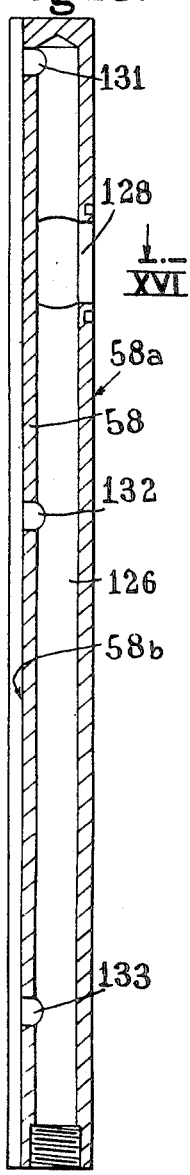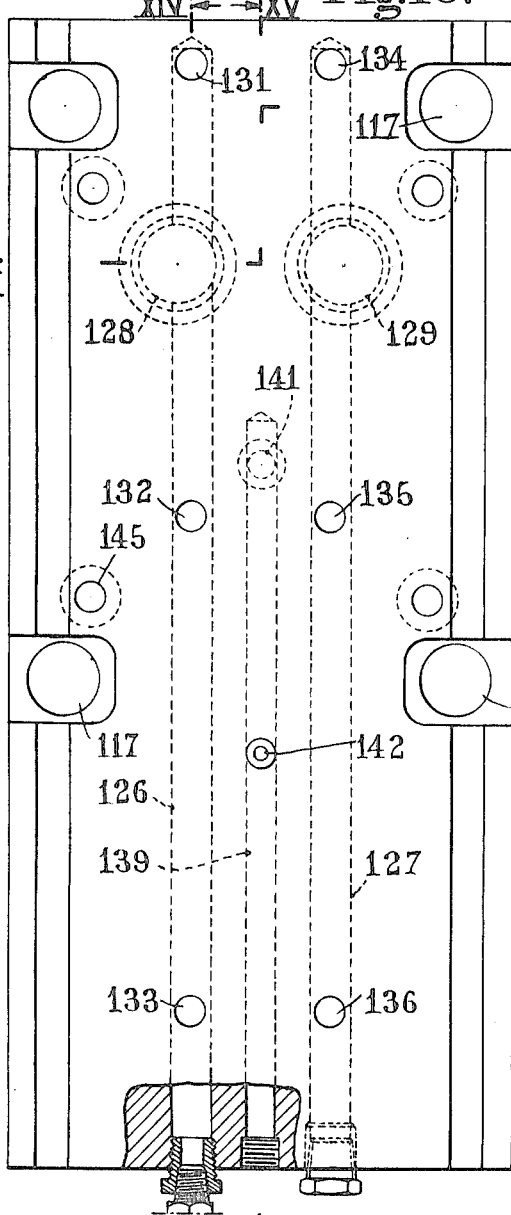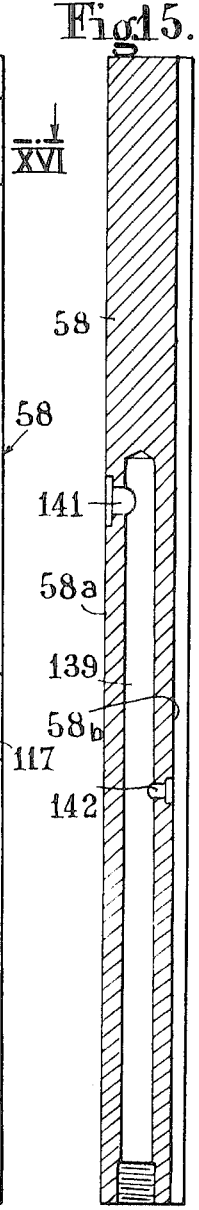

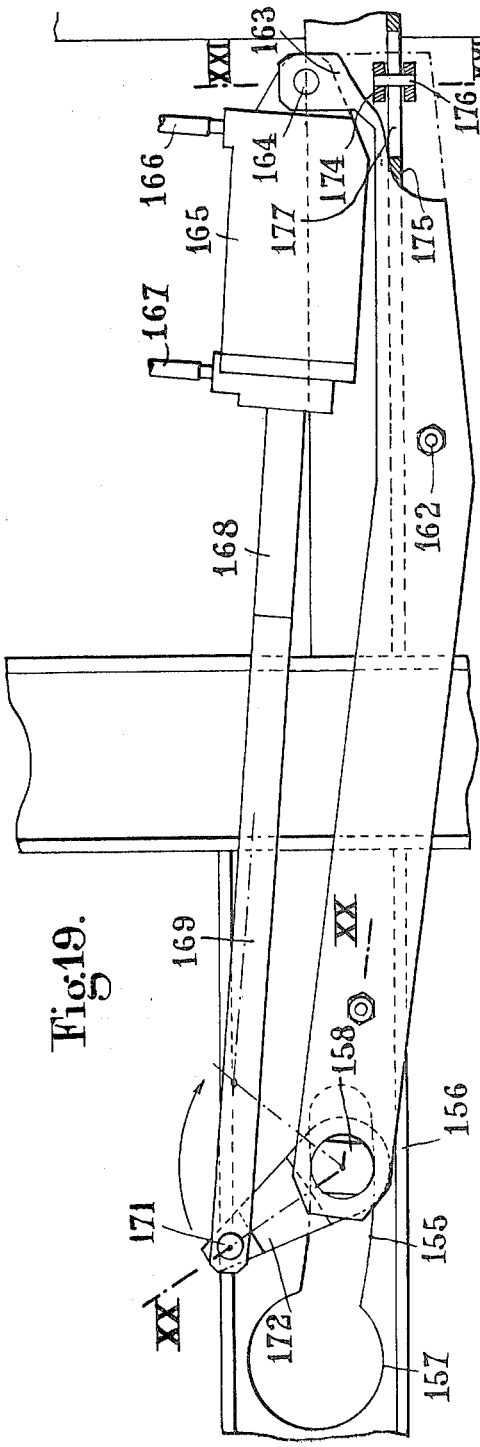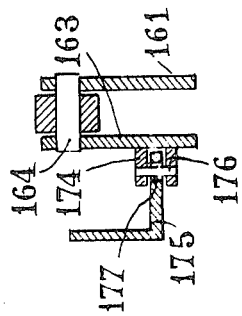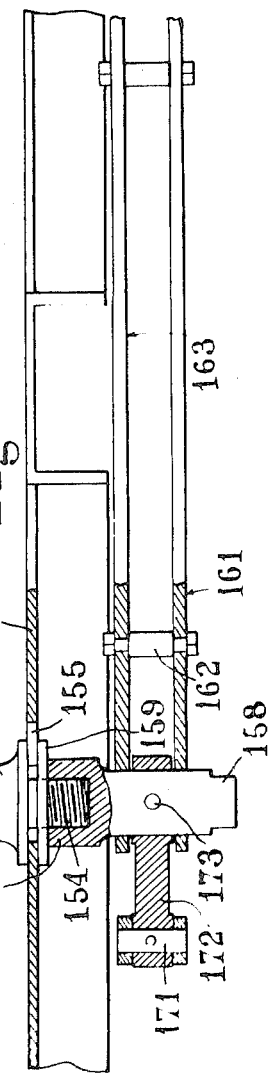

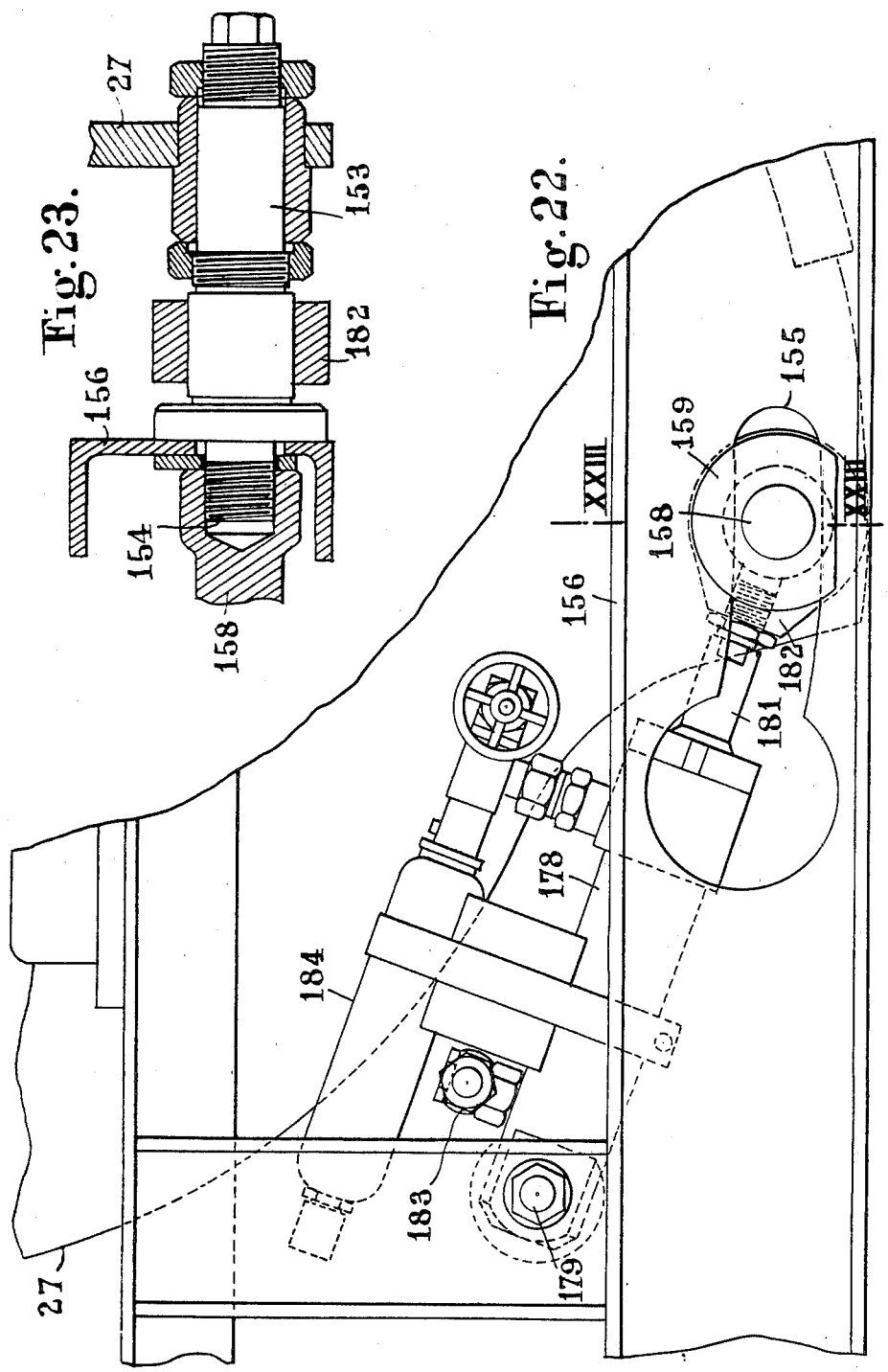

EXTRUDING-BLOWING MACHINE FOR MAKING HOLLOW PLASTIC ARTICLES

BACKGROUND OF THE INVENTION

The present invention is concerned with improvements in or relating to machines for manufacturing hollow plastic bodies or articles by the so-called extrusion-blowing process.

A machine of this type is already known which comprises a plurality of two-section molds mounted on a common rotary support rigid with a horizontal shaft driven for continuous rotation from a motor. The molds travel in succession under the die of an extruder producing a continuous tubular blank or vertical parison of suitable plastic material. Each mold is closed in succession to trap a parison section and this section is subsequently expanded by blowing within the mold to conform in shape to the mold impression or cavity, for example to a bottle configuration. After this shaping step and a sufficient cooling time corresponding to a predetermined angular value of a rotational movement of the mold carrier the mold concerned is open to permit the stripping of the blown article or body, and the cycle can subsequently be resumed.

In a known machine of the type mentioned hereinabove each mold consists of a fixed half-section or half-mold carried by a plate rotatably rigid with the rotary shaft, and of a longitudinally movable half-section or half mold. This movable half-mold is rigid with a rod mounted for longitudinal sliding movement in another plate rigid with the rotary shaft. Each movable half-mold is constantly urged towards the companion fixed half-mold by adequate spring means and opening and closing movements of each mold are controlled by cam means carried by the frame structure of the machine and engaged by a roller follower secured to the rod supporting the movable half-mold.

This purely mechanical arrangement for opening and closing the molds is attended by an inherent limitation in the rate of operation of the machine. In fact, if the rate of operation were increased, all the velocities would also be increased, i.e. both the velocity of rotation of the mold carrier and the velocity of translation of each movable half-mold in the opening or closing direction. Since the friction increases as the square of velocity, the lack of precision caused by this friction increases accordingly as is attended by discrepancies in the closing and opening of these molds which makes it necessary to reduce the rate of operation of the machine in order to remain within permissible limits. On the other hand, due to the accelerations imparted to the movable half-mold, which are proportional to the square of the velocities, considerable forces are required which are rather difficult to produce by using ordinary spring means.

SUMMARY OF THE INVENTION

It is the essential object of this invention to avoid these inconveniences by providing an improved device for controlling the opening and closing movements of the molds, this device being of particularly simple design and capable of affording a high degree of precision.

To this end, this machine for the manufacture of hollow plastic articles or bodies by the so-called extrusion-blowing process, which comprises a plurality of molds carried by a rotary support revolving continuously about a horizontal axis, each mold comprising a fixed half-mold and a half-mold movable parallel to said axis of rotation, an extruder producing a continuous tubular blank or parison delivered in vertical downward direction, and blowing means carried by the various molds, is characterized in that each movable half-mold is rigid with the rod of a pneumatic cylinder-and-piston actuator having its axis parallel to said axis of rotation and carrying a roller follower rolling on mold opening and closing ramps or cam members extending along circular arcs centered to said axis of rotation and carried by a transverse plate also centered to said axis and disposed behind said pneumatic actuators, and that the two chambers of said pneumatic actuators are connected respectively to pneumatic opening and closing valves respectively of a programmer rotatably solid with said mold support and responsive to fixed opening and closing cam members, said cam members being so disposed, in relation to the corresponding ramps or cam faces, that when the opening cam opens the associated valve the roller carried by the rod of the pneumatic actuator is pushed back against a curved section of the opening ramp corresponding to the desired mold opening law, and that, similarly, when the closing cam opens the associated valve the roller carried by the actuator rod is attracted against a curved section of the closing ramp corresponding to the desired mold closing law.

The combination of means for pneumatically controlling the movements of the actuator rods with a definition of the laws of the movement controlled by the particular contour of said ramps or cam members is advantageous in that the machine can operate both at very high speed and with a very high degree of precision.

Besides, according to a complementary feature characterizing this invention the main shaft of the machine is coupled to a hydraulic motor operating as a motor proper only during the starting period of the machine and which, during normal operation, acts as a hydraulic brake and regulator. In fact, since during the opening and closing of each mold the follower roller carried by the rod of the pneumatic actuator associated therewith is urged against a curved section (inclined to the axis) of the opening or closing ramp or cam member, this curved section of each ramp exerts on the roller a reaction of which the transverse component generates a power torque transmitted through the actuator cylinder to said shaft. Under these conditions, the various pneumatic actuators are also operative to cause the rotation of the complete movable assembly of the machine, and during the normal operation of the machine the hydraulic motor is no more effective except as a velocity regulator.

In a specific form of embodiment of the machine according to the present invention as applied to the manufacture of plastic bottles a production rate as high as 6,000 bottles per hour was obtained, as contrasted to a maximum rate of 3,000 bottles per hour obtained with machines of the same type but according to conventional design.

The machine according to this invention comprises other improvements concerning the means for locking the molds in their closed position; the adjustment during the machine operation of the plate carrying the mold opening and closing ramps or cam members; and also the design and arrangement of the cam means controlling the different pneumatic valves, the mold cooling system, the safety device, the hydraulic means for rotatably driving the main shaft and the movement of the machine as a whole.

BRIEF DESCRIPTION OF THE DRAWING

Now a typical form of embodiment of the present invention will be described by way of example with reference to the attached diagrammatic drawings in which:

FIG. 5 is a developed view showing the mold opening and closing ramps secured to the ramp-supporting plate;

FIG. 9 is an elevational view of the pneumatic system controlling the locking actuators or cylinder-and-piston units;

FIG. 10 is an end view of the same system as seen from the right-hand side of FIG. 9;

FIG. 11 is a circuit diagram of the pneumatic system for supplying hydraulic fluid to the locking actuators and to the blowing head of a single mold;

FIG. 13 is an elevational view showing a baseplate to which the movable half-mold is secured;

FIG. 14 is a section taken along the line XIV—XIV of FIG. 13;

FIG. 15 is a section taken along the line XV—XV of FIG. 13;

FIG. 16 is a section taken along the line XVI—XVI of FIG. 13;

FIG. 17 is an elevational view showing the safety device adapted to detect the presence of an object trapped between the joints of a closed mold;

FIG. 18 is a side elevational view of the device of FIG. 17;

FIG. 19 is an elevational view showing the device for locking the ramp-supporting plate in relation to the frame structure of the machine;

FIG. 20 is a section taken along the line XX—XX of FIG. 19;

FIG. 21 is a section taken along the line XXI—XXI of FIG. 19;

FIG. 22 is an elevational view showing the device for adjusting the angular position of the ramp-supporting plate;

FIG. 23 is a section taken along the line XXIII—XXIII of FIG. 22;

FIG. 24 is an elevational view showing the mechanism for rotatably driving the machine shaft;

DESCRIPTION OF THE PREFERRED EMBODIMENT

Figure 1:
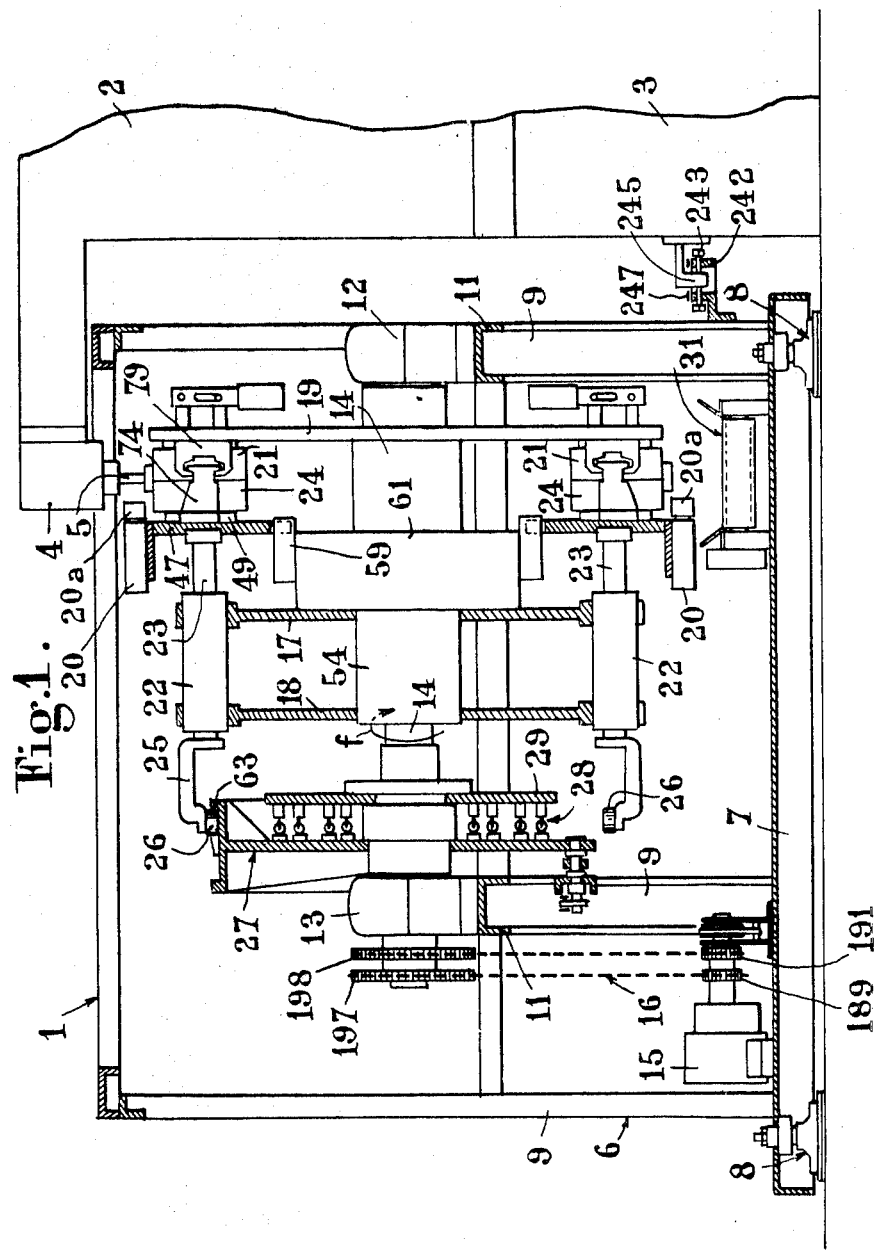
FIG. 1 is a vertical axial diagrammatic section showing a machine for molding hollow bodies or articles of thermoplastic material according to the teachings of the present invention.

A brief description of the essential component elements of the molding machine according to this invention will firstly be given with reference more particularly to FIG. 1 of the drawing.

The molding machine proper, designated in general by the reference numeral 1 in FIG. 1, is operatively associated with an extruder 2 pivotally mounted about a horizontal axis to a lower frame structure 3. This extruder 2 is of any known and suitable type; it is shown only in fragmentary and diagrammatic fashion in FIG. 1 and comprises an extrusion head 4 mounted in overhanging relationship to the other parts of the extruder and provided with a die designed for delivering by force feed a vertical tubular parison 5 of soft thermoplastic material.

The molding machine proper 1 comprises a frame structure 6 consisting essentially of a baseplate 7 supported by feet 8, and vertical uprights 9. These uprights carry horizontal cross members 11 having a pair of bearings 12 and 13 secured thereto. Trunnioned in these bearings is a horizontal shaft 14 driven for continuous rotation in the direction of the arrow f in FIG. 1. This shaft 14 is rotatably driven from a hydraulic motor 15 through transmission means denoted as a whole at 16 and to be described in detail presently.

The machine further comprises a rotary mold support, the molding impressions or cavities of the molds corresponding in shape to the hollow bodies or articles to be produced. This rotary support for two-section molds comprises three circular transverse plates 17, 18 and 19 spaced from one another. The plate 19 carries a number of fixed half-molds 21, say eight, regularly spaced about the axis of rotation of shaft 14, and the other two plates 17 and 18 carry along the outer periphery a corresponding number of pneumatic longitudinal actuators or cylinder-and-piston power units 22 controlling through their piston rods 23 the longitudinal movements of movable half-molds 24. Thus, each mold in the machine according to this invention consists of a fixed half-mold 21 carried by the plate 19 and of a movable half-mold 24 carried by a rod 23 of a pneumatic actuator 22.

Associated with each movable half-mold 24 is a longitudinal blowing cylinder 20 controlling the movement of a blowing head 20a adapted to blow into the hollow bodies within the molds.

The rod 23 of each pneumatic actuator 22 has its end remote from the end supporting the movable half-mold 24 rigid with a longitudinal support 25 having rotatably mounted thereon, about a transverse axis, a roller 26 adapted to engage mold-opening and mold-closing ramps or cam members carried by a transverse cam-supporting plate 27 secured to the frame structure of the machine but adjustable to the proper angular proposition as will be explained presently. The shaft 14 extends through this plate 27 and the latter carries on its right-hand face (as seen in FIG. 1) cam members adapted to actuate pneumatic valves incorporated in a programmer designated in general by the reference numeral 28, said valves being mounted on a circular plate 29 rotatably driven from said shaft 14. These valves are adapted to control the cyclical supply of pneumatic fluid to the various pneumatic devices of the machine, as will be explained presently.

FIG. 1 also shows a horizontal belt conveyor 31 carried by the baseplate 7 of the frame structure and adapted to discharge the wastes or sprues detached from the molded hollow articles.

Now reference will be made more particularly to FIGS. 2 to 5 inclusive for describing the device controlling the opening and closing of each mold in the machine. This device comprises essentially, for each mold, a double-acting pneumatic actuator 22 the rod 23 of which, rigid with the actuator piston 22a, is reciprocated in the longitudinal direction. The piston 22a divides the cylinder 22b of actuator 22 into two chambers, namely a closing chamber 22c and an opening chamber 22d. The closing chamber 22c is connected to a compressed air supply line 32 through a quick-drain device 33 and a circuit selector 34. Similarly, the opening chamber 22d is connected to another compressed-air supply line 35 via a quick-drain device 36 and a circuit selector 37.

Figure 3:
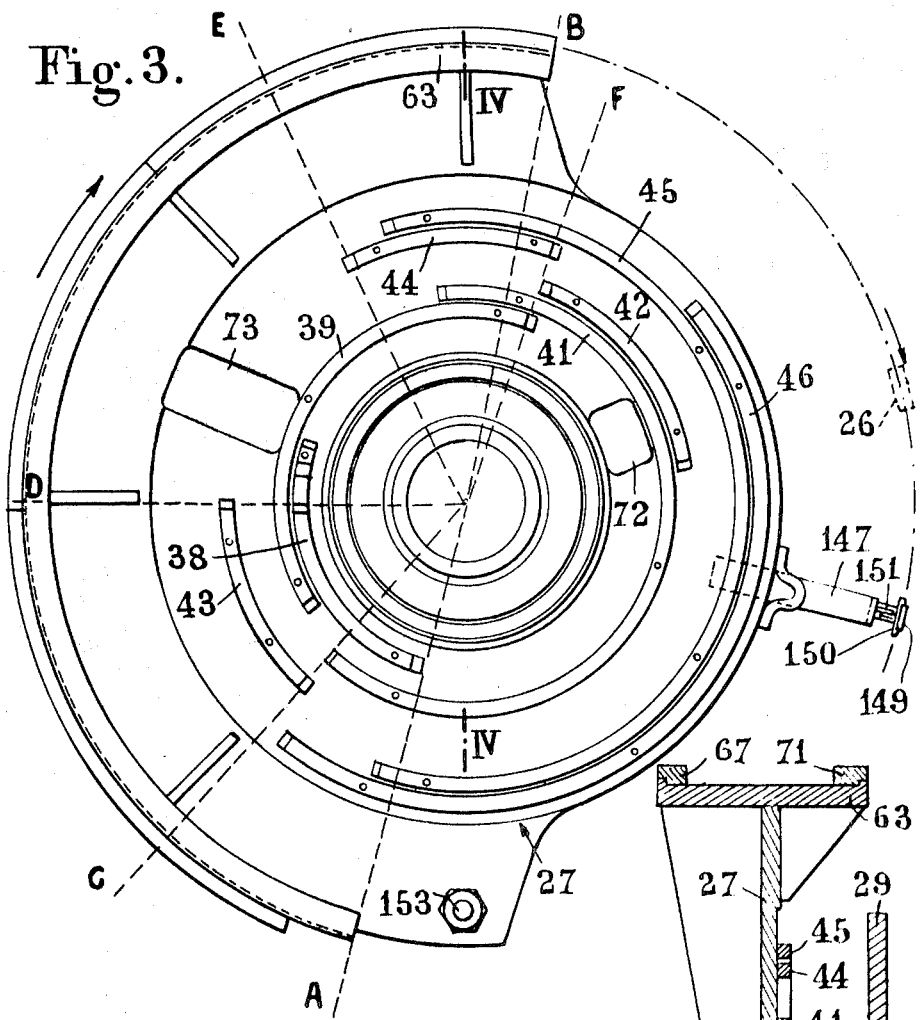
FIG. 3 is an elevational view showing the plate carrying the ramps or cam faces.
Figure 4:
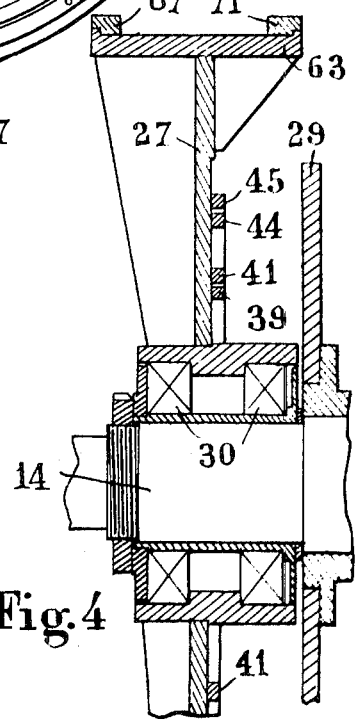
FIG. 4 is an axial section taken along the line IV—IV of FIG. 3.

Lines 32 and 35 are connected to a pair of pneumatic valves 28a and 28b respectively, these valves being an integral part of the programmer 28 carried by the circular plate 29. The rods provided for actuating these valves have rigidly mounted on their outer ends corresponding rollers engaging corresponding cam members secured to the transverse face of the ramp-supporting plate 27 mounted in turn to the shaft 14 by means of bearings 30. These cam members extend along circular concentric arcs having predetermined lengths and angular positions, and comprise means for adjusting their angular positions, as shown in FIG. 3. The plate 27 carries eight arcuate cams, i.e. from the center outwards, firstly a sprue-removing cam 38, then a release cam 39, a locking cam 41, a first-step blowing cam 42, a mold-opening cam 43, a mold-closing cam 44, a blowing cylinder control cam 45 and finally, at the outer periphery, a second-step blowing cam 46. All these cams extend on circular arcs having different radii and are distributed on different circles, but this arrangement given by way of example should not be construed as limiting the scope of the present invention.

Figure 2:
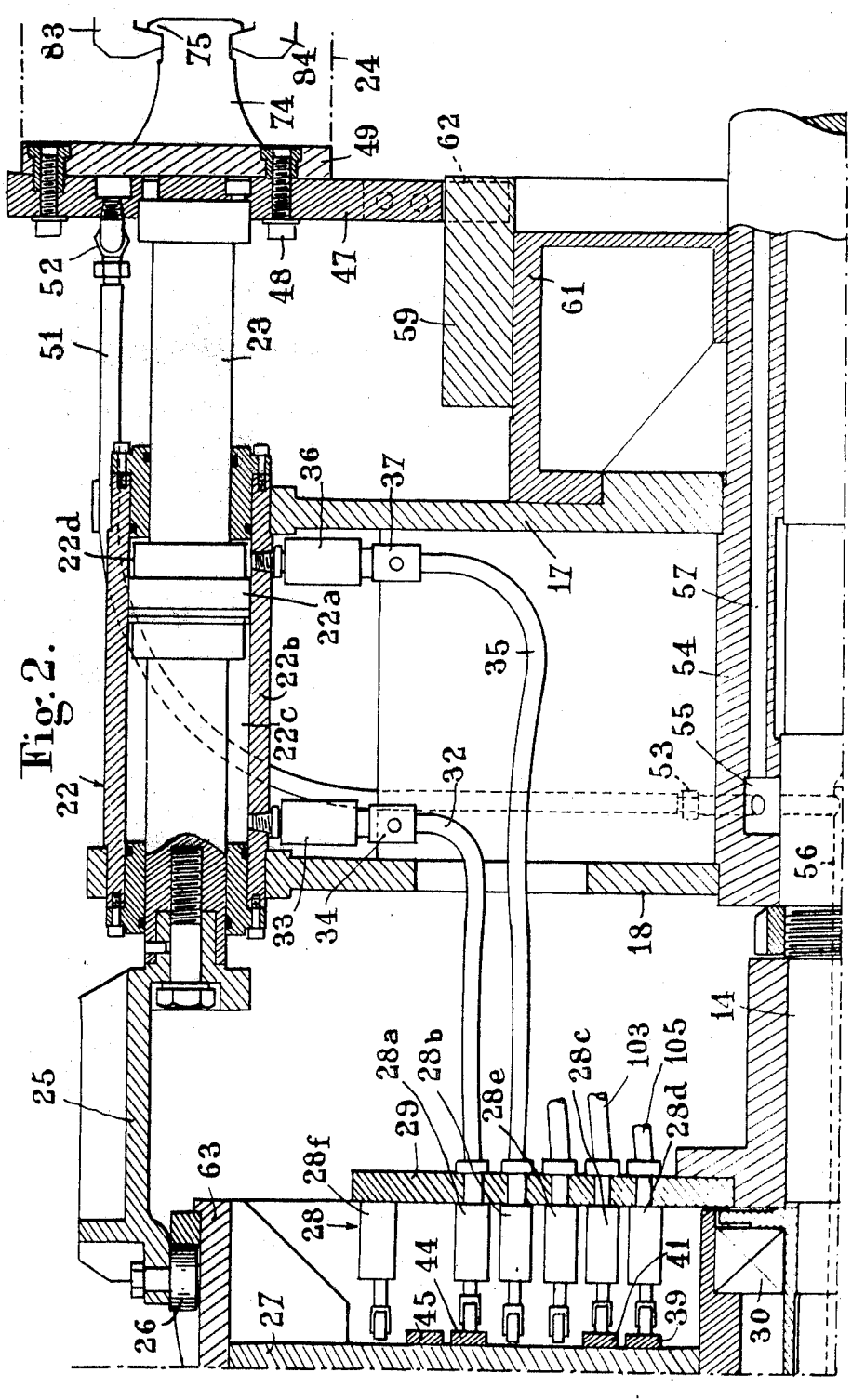
FIG. 2 is a longitudinal section showing on a larger scale the device controlling the mold closing and opening movements.

As can be seen in FIG. 2, the actuator and mold are shown in the closed-mold position corresponding to the opening of valve 28a of which the roller follower has engaged the mold closing cam 44. This valve 28a as well as the other valves associated with each mold are fed with compressed air through holes formed in the shaft 14 by reason of one hole per function contemplated, one multiway rotary seal at the shaft end and one pressure-reducing device per function in the control board. The supply of fluid to the various valves is not illustrated in the Figures in order to avoid overburdening the drawing.

The end of rod 23 of pneumatic actuator 22 which is adjacent to the fixed half-mold 21 is rigid with a mold-carrier plate 47 having secured thereto by means of screws 48 a baseplate 49 rigid with the movable half-mold 24. A flexible hose 51 is connected at one end to a union 52 carried by the mold-carrier plate 47 and at the opposite end to another union 53 mounted on a hollow shaft 54 coaxial to, and rotatably solid with, the main shaft 14. The first union 53 communicates with a circular inner groove 55 formed in the bore of hollow shaft 54 and connected in turn through a duct 56 formed in the shaft 14 to a source of cooling fluid, for example water. The circular groove 55 communicates likewise, via a longitudinal duct 57 formed in the hollow shaft 54 and a pipeline 138 connecting the duct 57 to an orifice formed in plate 19, with a plate or base member 58 secured to said plate 19 and having the fixed half-mold 21 secured thereto. The return of cooling fluid from the movable half-mold 24 and fixed half-mold 21 takes place in the same manner through ducts formed in shaft 14 and pipelines connecting the mold carrier plates 49 and 58 to these pipelines.

As can be seen in FIG. 2, each plate 47 supporting a movable half-mold 24 is guided in the longitudinal direction of the machine by a rotation-preventing key 59 secured to a support 61 rigid with the hollow shaft 54. This key 59 consists of a parallelepipedic block extending longitudinally of the machine and has its lateral faces slidably engaged by a pair of shoes 62 secured to the lateral faces of the mold carrier plate 47 so as to constitute a downward extension thereof. Thus, the mold carrier plate 47 and the movable half-mold 24 rigid therewith are held against rotation and the rod 23 of actuator 22 cannot revolve about its axis.

At its opposite end, i.e. the end remote from the movable half-mold 24, the rod 23 is rigid with support 25 to which the roller follower 26 is rotatably mounted. This roller 26, during the rotation of the movable assembly, coacts with ramps or cam members secured to a peripheral skirt 63 rigid with the cam-supporting plate 27, said skirt having a substantially semicylindrical configuration. Referring more particularly to FIG. 3, it will be seen that this skirt 63 extends along half a circle and that its development, in the full set of operations of a cycle corresponding to a complete revolution of shaft 14 (in the clockwise direction as seen in FIG. 3, corresponds to the mold-opening operation, to the transfer of the open molds and to the mold-closing operation.

As shown in FIG. 5, the skirt 63 carries a plurality of cam sections secured by means of screws 64 and interconnected from the inlet end A of skirt 63 to the outlet end B thereof. In FIG. 5, the rollers 26 engaging these various cam faces travel from left to right and at the inlet end A they are in the the closed-mold position as shown at 26a in FIG. 5, so as to be subsequently shifted to another position 26b corresponding to the open-mold position, and eventually emerge from these cam faces at the end B in the closed-mold position 26a.

The various cam sections carried by the skirt 63 are as follows, as seen from the inlet end A: firstly, an opening ramp 65 formed with an inlet edge 65a inclined downwards as seen in FIG. 5, then, a transverse rectilinear edge 65b followed by a curved upwardly inclined edge 65c merging into a transverse rectilinear edge 65d, then an intermediate counter-ramp 66 and a closing counter-ramp 67, these two counter-ramps having coextensive rectilinear transverse edges also aligned with the edge 65d which extend to the outlet end B.

On the other side, the skirt 63 carries in succession an opening counter-ramp 68 formed with a rectilinear transverse edge 68a registering with the edges 65a and 65b of opening ramp 65, then an upwardly inclined edge 658b merging gradually into a counter-ramp 69 having a rectilinear transverse edge, which registers with the aforesaid counter-ramp 66, then a closing ramp 71 formed with a transverse rectilinear edge 71a continuing the edge of counter-ramp 69, and then a downwardly inclined curved edge 71b merging into a transverse outlet edge 71c, these edges 71b and 711c merging substantially at a point coincident with the vertical plane x–y containing the machine axis.

Now the successive steps of the mold opening and closing operations will be described by assuming that a closed mold rotatably driven in the clockwise direction (FIG. 3), after overstepping the bottom dead point, reaches the position corresponding to the inlet end A of skirt 63. At that time, the mold roller 26 is in the closing position 26a and in this position it engages the rectilinear edge 68a of the opening counter-ramp 68. When the roller 26a lies between the rectilinear edges 65b and 68a of ramps 65 and 68, in a position denoted C, the mold-opening cam 43 controls the opening of pneumatic valve 28b and the supply of fluid to chamber 22d of actuator 22. At this time the piston rod 23 is pushed back to the left as seen in FIG. 2 and the roller 26 is urged by a force F1 against the rectilinear edge 65b. Then the roller 26 rolls along the last portion of edge 65b, and subsequently along the curved edge 65c moving gradually upwards in FIG. 5, thus causing the progressive opening of the mold. Then the roller continues to be urged against the rectilinear edge 65d until it reaches position D. This position corresponds in FIG. 3 to the end of the opening ramp 43 so that afterwards the valve 28b is closed again and the actuator 22 is no more supplied with compressed air. The roller 26 is in position 26b corresponding to the open mold and the movable assembly continues its movement, the mold remaining open while the roller travels between the counter-ramps 66 and 69, then between the rectilinear edge 71a of closing ramp 71 and the rectilinear counter-ramp 67.

When the roller reaches position E corresponding to the beginning of the mold-closing cam 44 (FIG. 3) this cam controls the opening of valve 28a and therefore the supply of compressed air to chamber 22c of actuator 22. At this time the rod 23 is pushed to the right as seen in FIG. 2 and the roller 26 is urged by a force $F_2$ against the last portion of rectilinear edge 71a. Roller 26 continues its movement along the curved edge 71b while being still urged thereagainst, and follows gradually this edge to closing position 26a when attaining the rectilinear edge 71c. At this time the mold has been gradually closed and the compressed air controlling the mold-closing movement is maintained until position F (FIG. 3) is reached, where the roller leaves the closing ramp 71 and is suspended in the air. This position corresponds to the end of the closing cam 44 as shown in FIG. 3 and at this time the cam releases the valve 28a which is thus reclosed to discontinue the supply of compressed air to actuator 22.

As can be inferred from the above description the actuator 22 is supplied with compressed air at the beginning, during the mold opening phase, i.e. a time period corresponding to an angular movement of about 45°, between positions C and D, and at the end, for closing the mold, during a time period corresponding to an angular movement of about 45°, between positions E and F. During these two phases the roller 26 remains urged against the portions of the cam edges which are shown in thick lines in FIG. 5.

The opening point of each mold can be adjusted by modifying accordingly the lengths of the rectilinear cam faces 66 and 69.

The contour of the curved edge 65c of opening ramp 65 and the contour of the curved edge 71b of closing ramp 71 are so determined that the longitudinal accelerations at the points of mergence with these rectilinear edges and at the points of inflexion of the curved edges be reduced to zero. Thus, any detrimental vibration at the beginning of the opening or closing stroke is safely avoided, as well as any shock at the end of this stroke and also at the points of inflexion (change of curve). On the other hand, the curved point 71b of closing ramp 71 includes a point of inflexion I engaged by the roller 26 when the movable half-mold engages the parison.

An important feature characterizing the mold opening and closing device is that the pneumatic actuators 22 constitute power members locking the self-rotation of shaft 14 and of the movable assembly carried thereby. In fact, as can be seen in FIG. 5, the roller 26, during the mold-opening stroke from position C to position D, exerts a longitudinal force $F_1$ against the curved edge 65c of ramp 65 and this force $F_1$ produces a transverse component $f_1$ tending to rotate the actuator 22 about the axis of shaft 14. Similarly, during the closing stroke between positions E and F, the roller 26 exerts against the curved edge 71b a longitudinal force $F_c$ (opposed to $F_1$) producing a transverse component $f_2$ of same direction as the transverse component $f_1$.

Under these conditions, each actuator 22 produces during a complete revolution two power torques of same direction, namely a first torque during the half-mold opening phase and a second torque during the half-mold closing phase. Since the movable assembly comprises eight pneumatic actuators 22, all these torques take place in succession to produce a variable torque causing the rotation of shaft 14. This specific feature of the molding machine according to this invention would be attended by the racing of shaft 14 if means were not provided for braking this shaft, as will be explained presently.

As clearly shown in FIG. 3, the ramp-supporting plate 27 has two opening 72 and 73 formed therethrough to permit the access from the exterior to the various valves of the programmer, for replacing these valves when necessary.

Besides, the ramp-carrier plate 27 is secured to the frame structure of the machine, at its lower portion, through a device of the screw-and-nut type to be described presently.

Figure 6:
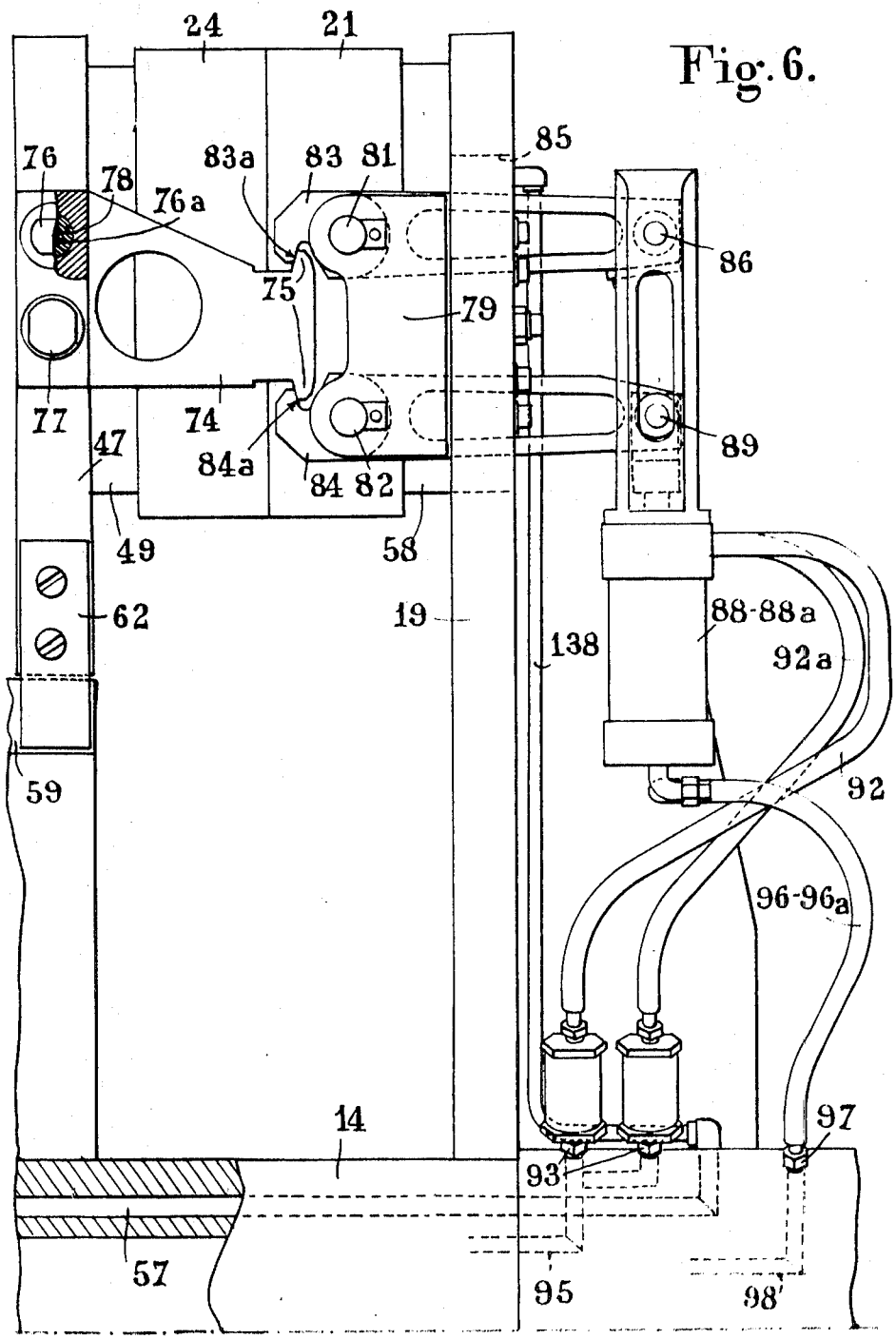
FIG. 6 is an elevational view showing the mold locking system.
Figure 7:
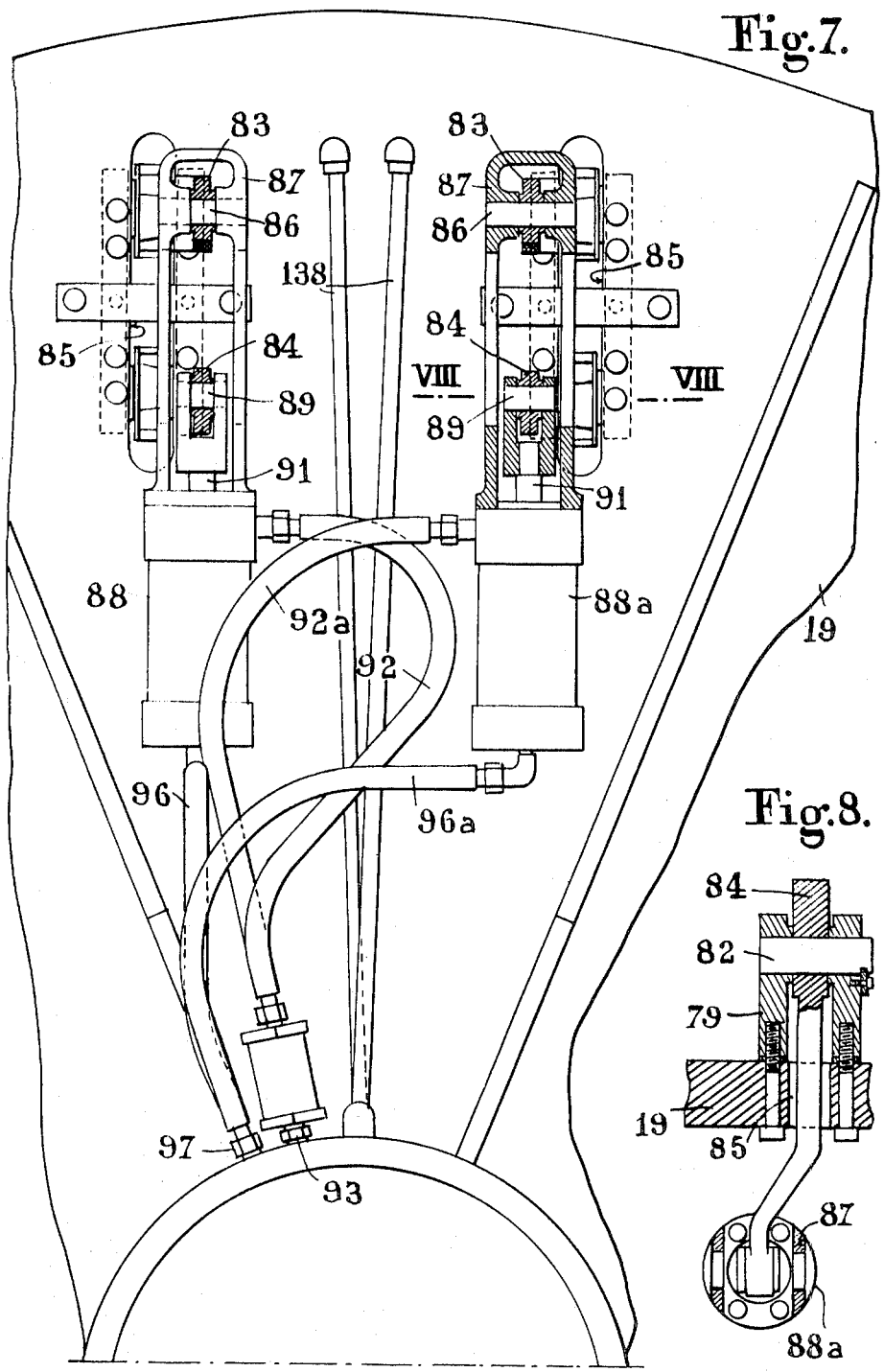
FIG. 7 is an end view with parts shown in cross section, as seen from the right-hand side of FIG. 6.
Figure 8:
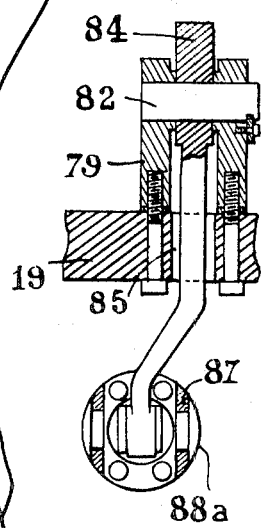
FIG. 8 is a section taken along the line VIII—VIII of FIG. 7.

Now reference will be made more particularly to FIGS. 6, 7 and 8 to describe the device contemplated for locking the molds in their closed position. As shown in FIG. 6 the plate 47 supporting the movable half-mold 24 carries on each of its lateral faces a locking lug 74 formed at its operative end with a pair of opposite horns 75. Each locking lug 74 is secured to the mold carrier plate 47 by means of a pair of superposed screws 76 and 77. The shank of the lower screw 77 extends through a hole of same dimension formed in the lug 74 and the shank 76a of the other screw 76 extends through a hole of greater diameter and also through an annular resilient rubber grommet 78 interposed between this shank 76a and the cavity therefor. This resilient rubber grommet 78 provides a slight angular play to avoid the transmission of shocks when the locking device is operated in the closing direction as will be seen presently The locking device further comprises on either side of the fixed half-mold a support 79 consisting of a pair of parallel flanges secured to the plate 19 and having pivoted thereto, by means of pins 81 and 82, a pair of hooks, namely an upper hook 83 and a lower hook 84. The operative ends 83a and 84a of these hooks 83, 84 coact with the edges of the horns 75a of locking lug 74 for firmly retaining this lug against movement in the locking position, i.e. when the ends of hooks 83 and 84 are moved towards each other. The operative ends 83a and 84a of hooks 83 and 84 engage the edges of horns 75 which are inclined to an angle controlling the prestressed condition of each mold in its closed position. This angle is so calculated that the movement is reversible; that is to say, the locking means can be released automatically by the reaction of roller 26 against the opening ramp in case the release means failed to operate.

The hooks 83 and 84 extend through a vertical slot 85 formed through the plate 19. The rear end of upper hook 83 is pivotally mounted by means of a pin 86 to a strap 87 rigid with the cylinder of a locking actuator 88. On the other hand, the rear end of the lower hook 84 is pivoted about a pin 89 to the end of the piston rod 91 of locking actuator 88. Of course, each fixed half-mold 21 has associated therewith a pair of locking actuators 88 and 88a controlling respectively the two pairs of hooks 83 and 84 disposed on either side of the fixed half-mold. The front ends of actuators 88 and 88a are connected via flexible hoses 92 and 92a to unions 93 carried by the hollow shaft 54 and communicating with a longitudinal locking duct 95 formed in this shaft 54. Similarly, the rear or bottom ends of actuators 88 and 88a are connected via flexible hoses 96 and 96a to unions 97 communicating with a release duct 98 formed through the hollow shaft 54.

As illustrated in FIGS. 9 and 10, the ducts 95 and 98 communicate inturn with pipelines 99 and 101, respectively. Pipeline 99 is connected to the outlet 102a of a pneumatic distributor 102 having its inlet 102b connected via a pipeline 103 to a locking valve 28c (FIG. 2) incorporated in the programmer 28. This valve 28c is responsive to the cam 41 of FIG. 3. These components are also illustrated in the diagram of the pneumatic control circuit of FIG. 11.

Besides, the pipeline 101 is connected to the outlet of a circuit selector 104 having one inlet connected to an outlet 102c of the distributor and the other inlet connected via a pipeline 105 to a release valve 28d incorporated in the programmer 28. This valve is responsive to the cam 39 of FIG. 3.

Under normal operating conditions it will be seen (see FIG. 3) that shortly after the mold has been closed under the control of cam 44, the cam 41 causes the opening of locking valve 28c so that this valve (FIG. 11) can supply compressed air to the front end of locking actuators 88 and 88a via distributor 102, between its inlet 102b and outlet 102a, and also through pipeline 99, duct 95 and flexible hoses 92 and 92a. Thus, the mold is locked in its closed position throughout the duration of the blowing of the tubular parison and the cooling of the blown or inflated hollow body. At the end of the cooling period the cam 39 opens the locking valve 28d which delivers compressed fluid through the circuit selector 104 to the pair of actuators 88 and 88a but at the bottom end thereof, in order to control the opening of hooks 83 and 84. Shortly afterwards the cam 43 controls the mold opening in the manner already described hereinabove.

In FIGS. 9 and 10, there is illustrated a device for releasing or unlocking the mold in case an object were trapped in the joint plane between the two mold halves, in order to permit the subsequent opening of the mold.

This device comprises a control valve 106 having its inlet connected through a pipeline 107 to the inlet 102b of distributor 102, i.e. to pipeline 103, the outlet of said valve being connected via another pipeline 108 to one control inlet 102d of distributor 102. This distributor comprises another control inlet 102e connected permanently through pipeline 109 to its inlet 102b.

The control valve 106 comprises a control lever 111 housed within an inverted-U section member 112 rigid with the rod 23 of actuator 22. The web of section 112 has formed therethrough an aperture 113 registering with said control lever 111 but only when the mold is closed. In this case, and in this case only, it is possible to actuate the lever 111 through this aperture 113 to release or unlock the mold in case an object were trapped between the two mold halves. The opening of control valve 106 is attended by the tilting of distributor 102 so as to supply pneumatic fluid to the bottoms of actuators 88 and 88a, and thus cause the mold to be released or unlocked. Under these conditions, it is possible to control manually the mold opening by means of an air hole connected to the circuit selector 37 of FIG. 2.

The purpose of the masking member 112 is to prevent the operation of control valve 106 as long as the mold is open. Therefore, it positively prevents any mold locking operation from taking place before the mold is duly closed. Otherwise, the mold might be closed by the roller 26 engaging the edge 65a (FIG. 5) after the operation of the locking means, thus causing jamming in the assembly.

The pneumatic circuit diagram of FIG. 11 also shows a pair of valves 28e and 28f incorporated in the programmer 28, these valves controlling the first and second blowing phases, respectively. These valves 28e and 28f are controlled by cams 42 and 46 of FIG. 3, respectively. The outlets of valves 28e and 28f are connected through a circuit selector 114 to the blow head 20a.

Thus, when the cam 42 controls the opening of valve 28e the blow head 20a is fed with compressed air under a relatively low pressure and then, once the parison has been distorted and pressed against the walls of the mold impression, the cam 46 controls the opening of valve 28f and therefore the supply of compressed air to said blow head 20a under a higher pressure.

Now reference will be made more particularly to FIGS. 12 to 16 inclusive to describe a typical form of embodiment of a device for mounting the two half-molds on their relevant supports.

Figure 12:
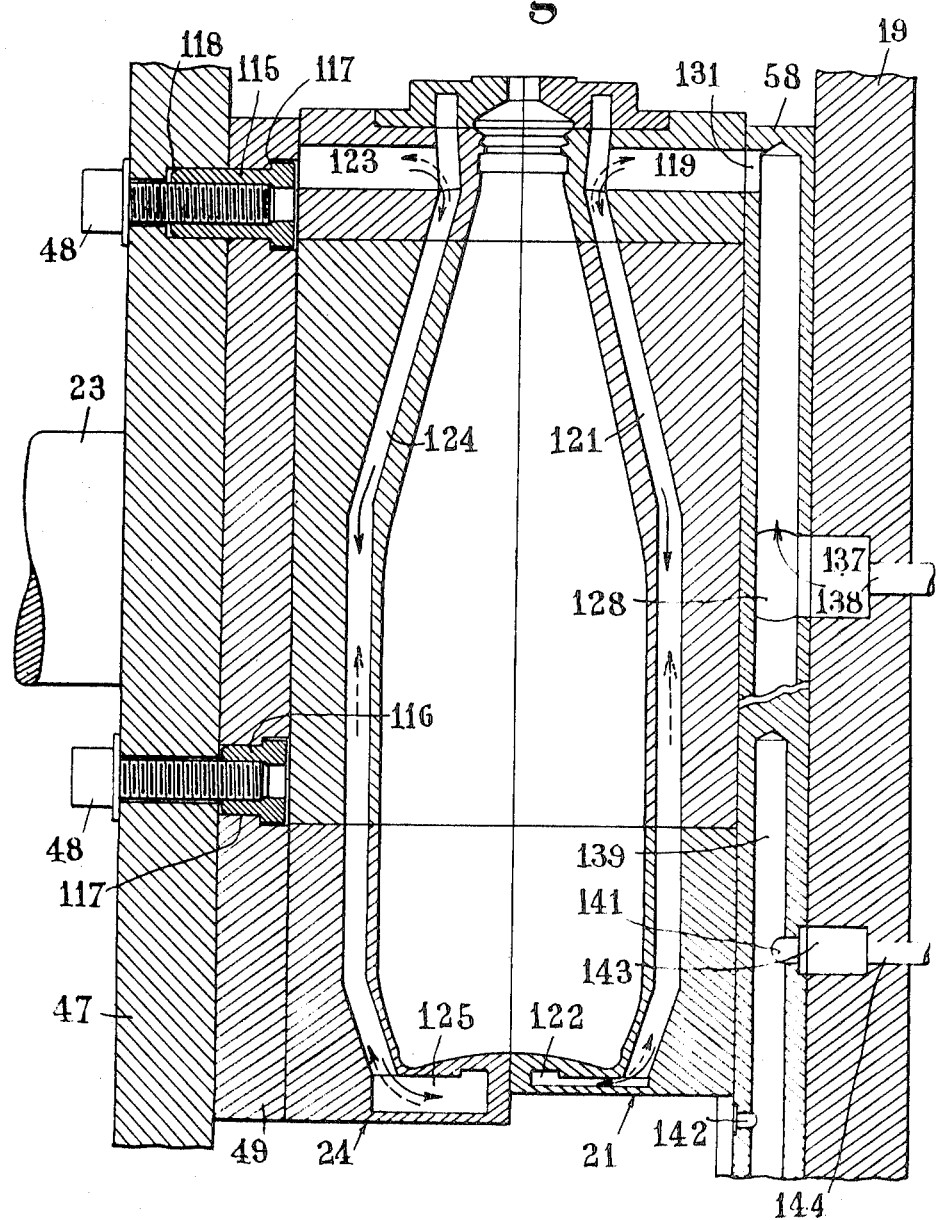
FIG. 12 is a longitudinal section showing a movable half-mold and a fixed half-mold with their supports, in the closed-mold condition.

As clearly shown in FIG. 12 the movable half-mold 24 is rigid with the plate or base member 49 secured in turn to the mold carrier plate 47 by means of screws 48. These screws engage corresponding nuts 115 and 116 sunk in recesses 117 formed in said baseplate 49. The upper nut 115 is longer than nut 116 and projects into a hole 118 formed in plate 47, with a view to ensure an accurate positioning of base member 49, and therefore of half-mold 24 solid therewith. On the other hand, the lower and shorter nut 116 is contained entirely in the recess 117 formed in said base member 49.

Similarly, the fixed half-mold 21 is rigid with plate 58 secured in turn to the fixed plate 19 by means of screws and nuts 48 and 46 similar to those used for securing the mold carrier plate 49 to plate 47.

The fixed and movable half-molds 21 and 24 respectively are hollow and their joint cavity corresponds to the shape of the desired final molded hollow body, in this example a bottle. On the other hand, cooling ducts are formed in these half-molds. In FIG. 12 it will be seen that the fixed half-mold 21 has formed therein an upper horizontal duct 119 permitting the ingress of cooling water, this duct 119 communicating with a substantially vertical duct 121 extending along said mold impression and opening at its lower end into a transverse duct 122 causing same to communicate with another vertical duct, parallel to duct 121 and eventually another horizontal duct, parallel to said duct 119, for returning the water used for cooling the mold. Similarly, the movable half-mold 24 has formed therein an upper horizontal duct 123 for introducing cooling water, which communicates with a substantially vertical duct 124 following the mold impression and opening in turn into a transverse duct 125 causing same to communicate with water return ducts provided behind the aforesaid ducts 123 and 124. The path of the incoming water is shown by thick arrows in FIG. 12 and the water return path is shown by the dashline arrows.

Now reference will be made to FIGS. 13 to 16 inclusive for describing more in detail the plate 58 carrying the fixed half-molds 21. This plate 58 of parallelepipedic general configuration is intended for distributing cooling water to the movable half-mold without requiring the use of any external union, and at the same time it is adapted to transmit the compressed air necessary for the operation of the pneumatic device provided for stripping the sprue formed at the end of the molded half-molds.

As clearly shown in FIG. 13 the mold-carrier plate 58 has four holes 117 formed therein for receiving nuts 116 (FIG. 12) securing the mold-carrier plate 58 to the disc or plate 19.

The mold carrier plate 58 has two vertical parallel ducts formed therein, namely a cooling water inlet duct 126 and a cooling water return duct 127. Both ducts 126 and 127 communicate with a water feed port 128 and a water exhaust port 129, respectively, formed through the rear face 58a of plate 58. In the front face 58b of said plate 58 are formed a plurality of holes connecting the ducts 126 and 127 to corresponding ducts formed in the fixed half-mold. In FIG. 13 it will be seen that three holes 131, 132 and 133 are formed in the front face and communicate with duct 126, these holes registering with corresponding holes formed through the mold wall for supplying cooling water to this mold. Similarly, three holes 134, 135 and 136 are formed into the front face of plate 58 and communicate with the inner duct 127, these holes registering with corresponding holes formed in the mold for discharging the warm water having assisted in cooling the molds. Of course, suitable O-rings (not shown) are disposed around the holes 131 to 136 for sealing purposes.

The orifices 128 and 129 of mold carrier plate 58 register with corresponding holes formed into the plate 19, which communicate through ducts 138 connected to this plate with the water supply or warm water return ducts formed through the hollow shaft 54 (FIG. 2). Thus, in FIG. 12 it will be seen that orifice 128 registers with a hole 137 formed through the plate 19 and that this hole 137 communicates with the pipeline 138 connected to the duct 57 supplying cooling water to the mold. This cooling water fed through pipeline 138 is thus directed into the movable half mold 21 via duct 126 and the various inlet orifices formed in the mold of which only the upper orifice 131 is shown in FIG. 12.

The mold carrier plate 58 has also formed therein a vertical duct 139 shorter than, parallel to, and disposed between the pair of ducts 126 and 127 provided for the cooling water circulation. This duct 139 opens at its upper end into the rear face 58a of mold carrier plate 58 via an orifice 141 and communicates on the other hand with an orifice 142 formed through the front face 58b of plate 58.

As clearly shown in FIG. 12 the orifice 141 registers with a hole 143 formed in the plate 19 and communicating with a pipeline 144. This pipeline 144 communicates in turn with a valve (not shown) of programmer 28, which valve is responsive to the sprue-removing cam 38. When this cam controls the opening of the corresponding valve, compressed air is delivered to pipeline 144 and flows through the duct 139 and front orifice 142 to actuate the pneumatic sprue-removing means and the air jet adapted to cause the thus detached sprue to fall down. This air jet will thus eject the sprue which falls upon the conveyor belt 31 provided at the lower portion of the machine.

The fixed half-mold is secured to the plate 58 by means of screws extending through holes 145 having their heads contained in the enlarged portions of these holes, which opens into the rear face 58a. Thus, the screw heads are recessed in holes 145 when the movable half-mold is secured to the mold carrier plate 58.

The plate 49 carrying the movable half-mold 24 is constructed in a manner similar to plate 58 carrying the fixed half-mold 21, except that it does not comprise a duct 139 for removing the sprue from the molded body.

The fixed half-mold illustrated by way of example in the drawing actually comprises, in addition to the cooling inlet and outlet, a water inlet and outlet for the sprue-removing device which is independent of the mold. According to other alternate forms of embodiment, each mold carrier plate may comprise a plurality of water inlet orifices and water outlet orifices, and possibly ports for the ingress and exhaust of compressed air disposed differently according to requirements.

Now reference will be made to FIGS. 17 and 18 to describe the safety device provided for stopping the machine in case an object happened to be trapped between the edges of the joint plane of each half-mold and prevented the complete closing of the mold.

This device comprises an arm 150 pivotally mounted about a pin 146 to one arm of an angle member 147 secured by means of screw 148 to the plate 27 supporting the cam members. As clearly shown in FIG. 3 this angle member 147 is secured to the cam plate 27 in an angular position so selected that the molds are normally closed when their roller move past the arm 150, the latter carrying at is lower end an adjustable feeler 149. Besides, this arm 150 is adapted to actuate a switch 151 and normally urged by spring means 152 to the position in which this switch is closed. As long as the rollers 26 carried by the rods 23 of pneumatic actuators 22 are in their normal position corresponding to the closed-mold position (as shown at 26a in FIG. 17) the feeler 149 is not engaged by these rollers in position 26a and switch 151 remains closed. On the other hand, if one roller 26 is not in this normal position 26a, due to the interposition of any object trapped between the two mold halves, it will engage the feeler 149 and thus cause the arm 150 to pivot in the counterclockwise direction as seen in FIG. 17, so as to open the switch 151. At this time the switch opening controls the automatic stopping of the machine and the displaying of the corresponding fault on the control board.

FIG. 17 shows at 26b the maximum shifted position likely to be occupied by the roller 26, which corresponds to the fully open mold condition.

Now reference will be made more particularly to FIGS. 19, 20 and 21 to describe the means provided for pneumatically locking the cam-supporting plate 27 with respect to the frame structure of the machine. This plate 27 has its lower portion rigid with a shaft 153 having a screw-threaded extension 154 projecting through a curved slot 155 formed in a horizontal U-section member 156 extending transversely and forming an integral part of the frame structure of the machine. This curved slot 155 opens into a hole 157 of relatively large diameter. Screwed on the threaded extension 154 of shaft 153 is a nut 158, a washer 159 being interposed between this nut and the web of section 156. This nut is rotatably mounted in a support 161 consisting of a pair of parallel plates interconnected by distance-pieces 162. This support 161 comprises at its opposite end a pair of vertical wings 163 having pivotally mounted thereon, about a pin 164, a pneumatic actuator 165 connected via flexible hoses 166 and 167 to a manual pneumatic control valve (not shown). The piston rod 168 of actuator 165 is operatively connected to a bar 169 fulcrumed in turn about a pin 171 carried by a connecting rod 172 rigidly connected through a pin 173 to the aforesaid nut 158.

The cam carrier plate 27 is held in a locked position relative to the frame structure, in the proper angular position, by means of said nut 158 engaging the screw-threaded extension 154 and thus holding against motion the shaft 153 rigid with plate 27. In this locked condition the longitudinal centerline of connecting-rod 172 rigid with nut 158 is positioned as shown by the dash-and-dot line in FIG. 19.

When it is desired to modify the angular position of the cam-supporting plate 27, fluid under pressure is directed into the bottom end of actuator 165, i.e. through flexible hose 166, thus causing a pivotal movement of connecting-rod 172 in counterclockwise direction to the position shown in thick lines in FIG. 19. The rotation of nut 158 thus obtained is attended by a release of shaft 153, so that the cam-supporting plate 27 can be adjusted angularly as desired and in a manner to be described presently.

As clearly illustrated in FIG. 21 the rear wing 163 carries a strap 174 of which the upper and lower legs extend above and below, respectively, of a horizontal wing of an angle section 175 forming an integral part of the frame structure of the machine. The lugs of strap 174 are interconnected by a vertical pin 176 slidably engaged in an elongated slot 177 formed in the horizontal wing of angle section 175. This strap 174 constitutes a rotation-inhibiting member and on the other hand the pin 176 slidably engaged in slot 177 limits the permissible sliding movement of support 161 on the frame structure during the angular adjustment of the cam-supporting plate 27.

Besides, said support 161 is also provided for absorbing the reaction of actuator 165, thus reducing the flexion stress exerted on the nut 158.

Now reference will be made more particularly to FIGS. 22 and 23 to describe the device provided for adjusting the angular position of the cam-carrier plate 27. This adjustment is effected by means of a hydraulic actuator 178 having its cylinder fulcrumed about a pin 179 carried by the frame structure of the machine. The piston rod 181 of this actuator is connected via a strap 182 to the shaft 153 secured to the lower portion of the cam-carrier plate 27. The cylinder of actuator 178 has a union 183 connected via a flexible hose (not shown) to a plunger-type oil-metering device (not shown) secured to the control board or instrument panel of the machine. On the other hand, a pressure-oil accumulator 184 is secured to the cylinder of actuator 178. This accumulator is connected to the actuator 178 on the rod (or nose) side thereof.

When it is desired to modify the angular position of the cam-carrier plate 27, the latter is firstly released in the manner already described in the foregoing. To rotate the cam-carrier plate 27 in the counterclockwise direction (FIG. 22) the piston of the oil-metering device is depressed in order to force the oil out from the bottom of actuator 178 through union 183. On the other hand, if the piston of the oil-metering device is relieved, oil is allowed to penetrate into this device, this oil being forced by the piston of actuator 178 by the dual action of the oil under pressure contained in accumulator 184 and of the reaction produced by the mold opening and closing ramps on rollers 26, these combined actions causing the clockwise rotation of the cam-carrier plate 27 as seen in FIG. 22.

Figure 25:
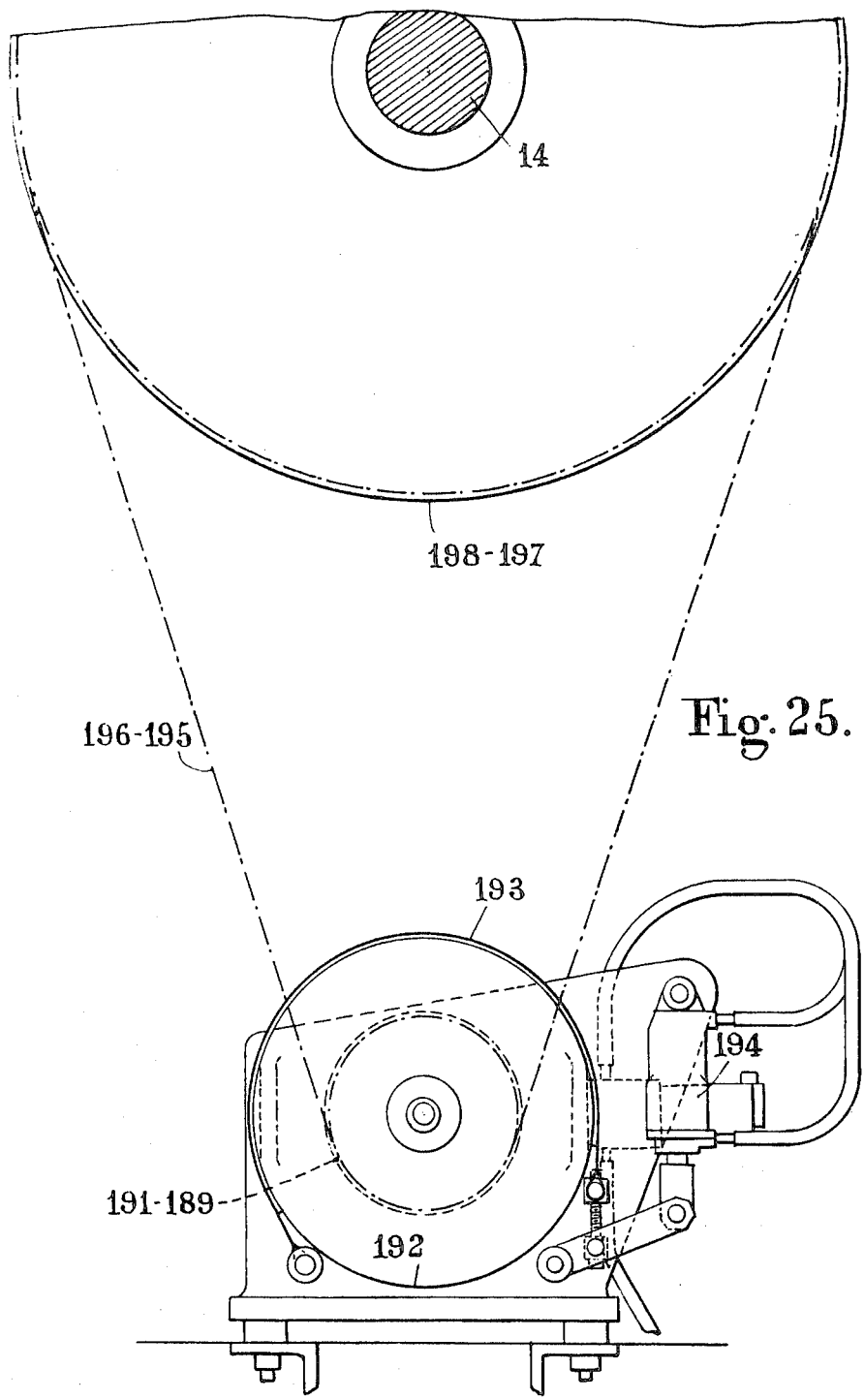
FIG. 25 is an end view taken from the left hand side of FIG. 24.

Referring more particularly to FIGS. 24 and 25, the mechanical assembly provided for rotatably driving the main shaft 14 will now be described in detail. This assembly comprises essentially a slow-motion hydraulic motor 187 driving through a coupling device 188 a pair of sprockets 189 and 191 rigidly coupled to each other. The shaft of these two sprockets is also rigid with a drum 192 having its outer periphery slidably engaged by a brake lining 193 actuated by a cylinder-and-piston unit 194. Sprockets 189 and 191 are coupled through respective chains 195 and 196 to a pair of chain wheels 197 and 198. The chain wheel 197 is keyed to shaft 14 and the other chain wheel 198 is mounted for loose rotation on this shaft. Both chain wheels 197 and 198 are mutually coupled through a chain-tensioning device 190 tending to cause these wheels to rotate in opposite directions.

Thus the shaft 14 is driven at constant speed by the two tensioned spans of the respective chains 195 and 196, without any angular shift, during the torque reversal exerted on the shaft.

The chains wheel 197 rotatably rigid with shaft 14 carries magnetized studs 199 disposed along a circle centered to the axis of shaft 14 and corresponding in number to the molds carried by the machine. The studs 199 move past a magnetic pickup connected to a first counter counting the number of hollow bodies manufactured during one minute from the first passage of a stud 199 past the pickup. The studs 199 are also used for stopping the machine in a position such that no mold is stopped beneath the extrusion head, as this would cause material to accumulate between this head and the mold, since the extrusion takes place continuously. To end, the angle of stoppage of the movable assembly of the machine having a known order of magnitude, the stopping order emitted from the control board is stored in a memory and the machine stopping is actually controlled when the first magnetic stud 199 moves past a magnetic microswitch disposed in close proximity of the path followed by these studs. Thus, the machine is stopped with the molds disposed in a predetermined position.

Figure 26:
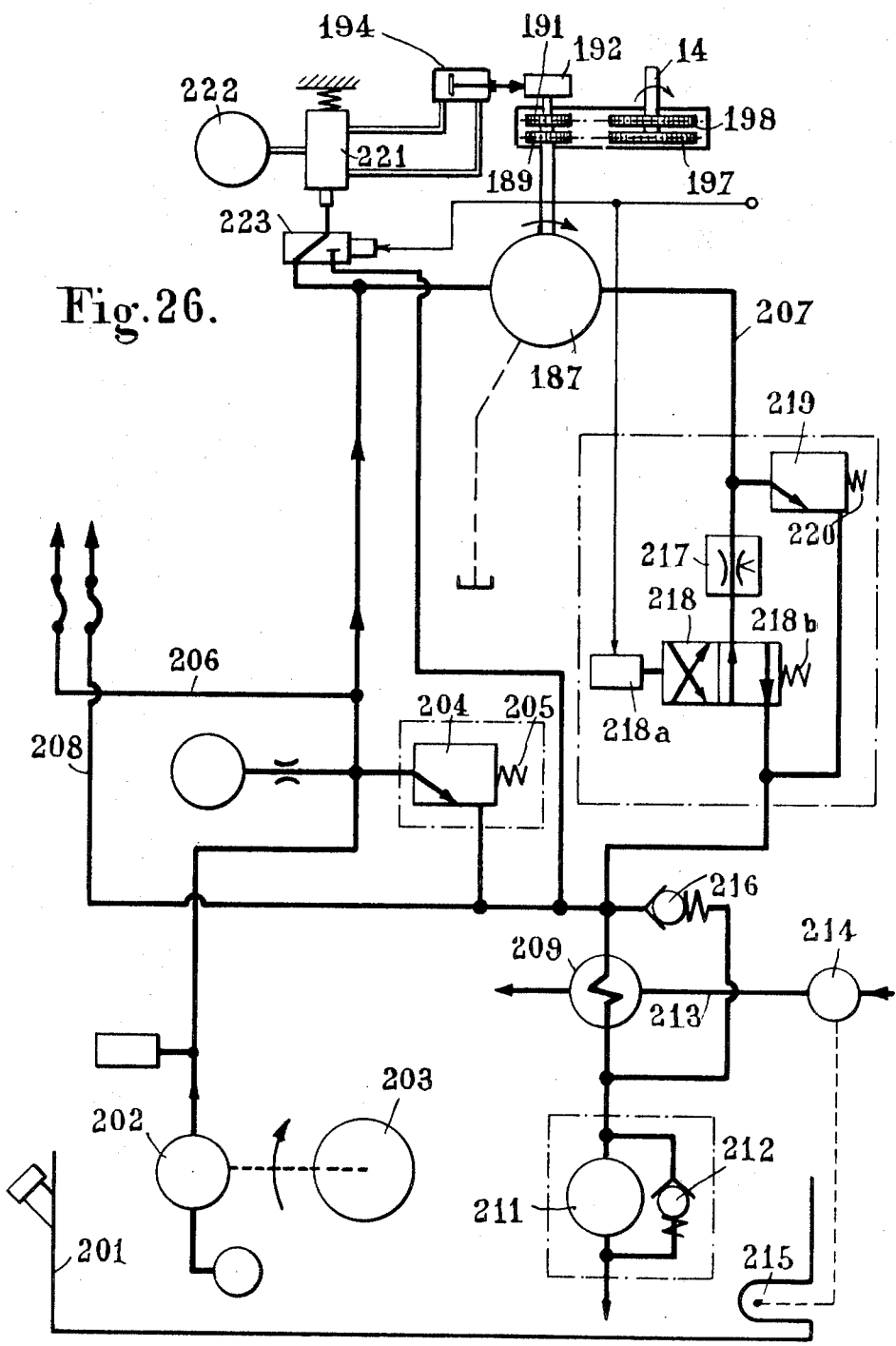
FIG. 26 is a circuit diagram of the hydraulic system for rotatably driving the machine shaft.

Now reference will be made to FIG. 26 to describe the hydraulic control circuit of the machine-driving system.

This hydraulic control circuit comprises an oil reservoir 201 from which oil is sucked by a constant-output pump 202 rotatably driven from an electric motor 203. This pump supplies oil under pressure to the hydraulic motor 187 and the excess oil is returned to the reservoir via a valve 204 loaded by a spring 205. This loaded or gauged valve 204 controls the starting torque and the maximum feed of hydraulic motor 187.

Said pump 202 is also adapted to feed via a pipe line 206 a hydraulic actuator of the cylinder-and-piston type controlling the upward movement of the extruder, this actuator being connected through a pipe line 208 to reservoir 201. The outlet of the loaded or gauged hydraulic valve 204 is connected to the reservoir 201 via a heat transfer device 209 and a filter 211 having branched off a spring-loaded nonreturn valve 212. The oil flowing through the heat transfer device 209 is cooled by means of an auxiliary water circuit 213 having interposed therein a heat-controlled or thermostatic valve 214 responsive to a temperature detector 215 mounted in the reservoir 211. A spring-loaded nonreturn valve 216 is also branched off the oil circuit through said heat transfer device 209.

The exhaust side of hydraulic motor 207 is connected through an output regulator 217 to one inlet of a distributor 218 responsive to a solenoid 218a and equipped with a return spring 218b. The outlet of said distributor is connected to the heat transfer device 209. On the other hand, a valve 219 loaded by a spring 220 is branched off the output regulator 217 and distributor 218.

In the machine according to this invention the motor 187 operates as such only during the starting of the machine. In fact, as already explained in the foregoing, when the machine is operating the reactions exerted by the mold opening and closing ramps against the rollers 26 carried by the various rods 23 of pneumatic actuators 22 produce a power torque capable of rotatably driving the shaft 14 and the movable assembly. Under these conditions, during the normal operation of the machine the hydraulic motor 187 is operative only as a hydraulic brake and speed regulator.

The velocity of rotation is adjusted by modifying the output downstream of hydraulic motor 187 by means of the output regulator 217. The electrically controlled distributor 218 is adapted to cut off the hydraulic circuit and thus stop the machine. The spring-loaded discharge valve 219 creates a predetermined braking force when stopping the machine.

Since internal leakages take place within the hydraulic motor 187 the machine according to this invention would work back if the brake 193 acting on the drum 192 coupled to main shaft 14 had not been provided. This brake 193 is actuated by the cylinder-and-piston unit or actuator 194 which may be either hydraulic or pneumatic. In the example illustrated in FIG. 26, this actuator 194 is of the pneumatic type and controlled by a distributor 221 having its inlet connected to a source of compressed air 222 feeding the different actuators 22. The pneumatic distributor 221 is monitored by a hydraulic valve 223, which is normally closed but open when the machine is operating. The outlet of this valve is connected to the control input of distributor 221, one valve inlet being connected to the pipe line delivering hydraulic fluid to the hydraulic motor 187, the other inlet being connected to reservoir 201. This valve 223 is electrically controlled and energized simultaneously with solenoid 218a of ON-OFF distributor 218, so as to be closed when the order for stopping the machine is emitted.

Under these conditions, if the oil pressure upstream of the hydraulic motor happened to drop, or in the occurrence of any accident likely to cause the shaft 14 to race, the distributor 221 will supply control fluid to actuator 194 for applying the brake.

According to a modified form of embodiment the brake control actuator 194 may be of hydraulic nature, and in this case it is controlled through a solenoid-operated valve inserted in its supply circuit connected to the input of motor 187.

Figure 27:
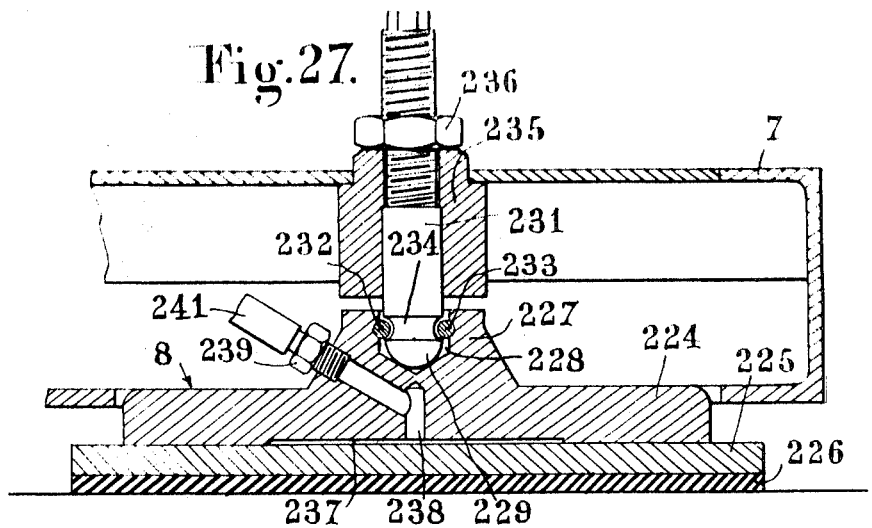
FIG. 27 is a vertical section showing on a larger scale a single foot of the machine base.
Figure 28:
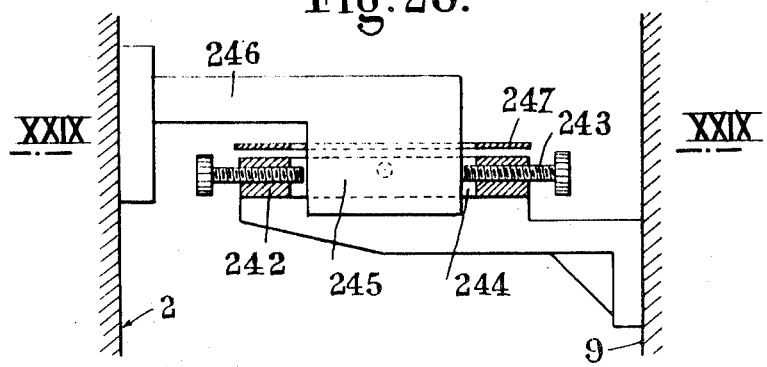
FIG. 28 is a fragmentary vertical section showing the lower portion of the frame structure of the machine and also of the frame structure of the extruder.
Figure 29:
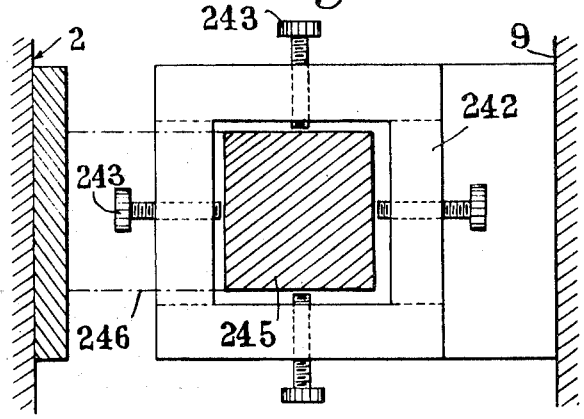
FIG. 29 is a horizontal section taken along the line XXIX—XXIX of FIG. 28.

Now reference will be made to FIGS. 27 and 28 for describing the device provided for adjusting the position of the movable assembly as a whole in relation to the extruder.

As already explained in connection with FIG. 1 the base 7 of the frame structure of the machine according to this invention is supported on the floor by means of four feet 8, of which one is shown in axial section and on a larger scale in FIG. 27. As clearly shown in this Figure, this foot comprises a horizontal shoe 224 bearing on a metal plate 225 bearing in turn on the floor through the medium of a pad 226 of resilient material such as neoprene.

The shoe 224 of foot 8 has an upper extension in the form of a hub 227 having an axial blind hole 228 receiving the part-spherical head 229 of a vertical screw 231. This head 229 is retained in the hole 228 by means of a pair of elastic pins 232 and 233 engaging the one a groove 234 formed in said screw 231 and a notch formed in the inner wall of blind hole 228, respectively. The screw 231 extends through a socket 235 welded to the baseplate 7 of the frame structure of the machine and screwed to the upper portion of this screw 231 is a nut 236 bearing upon the top of socket 235. Rotating this screw 231 permits of adjusting the vertical position of baseplate 7 of the machine frame in relation to said shoe 224. The net 236 is tightened once the desired adjustment has been obtained.

The face of shoe 224 which engages the baseplate 225 is hollowed in its central portion to provide a relatively shallow chamber 237 communicating through a duct 238 with a union 239 connected in turn to a compressed-air supply pipe line 241.

Thus, when it is desired to adjust the position of the frame structure of the machine in relation to the extruder, it is only necessary to supply compressed air to the four flexible hoses 241 connected to the four feet 8 so that this compressed air penetrating into each chamber 237 escapes between the registering faces of shoe 224 and baseplate 235, thus forming an air cushion. Under these conditions, it is very easy to move the machine in the horizontal direction to the desired position. When this position has been reached, the supply of compressed air to the flexible hoses 241 is discontinued, the four shoes 224 fall back onto the corresponding baseplates 225 and the frame structure of the machine is properly positioned.

At their lower portions, the pair of uprights 9 adjacent the extruder 2 carry a square frame 242 having inserted through its four sides a plurality of adjustment screws 243 extending at right angles to these sides, respectively. The central square-sectioned groove 244 of frame 242 receives therein a vertical wing 245 also of square cross-sectional configuration which is an integral part of a horizontal bracket 246 secured to the frame structure of extruder 2. This wing 245 engages a horizontal plate 247 of square configuration, consisting of transparent material. This plate 247 bears on the frame 242. Two orthogonal scales are provided on this plate 247.

By turning the four screws 243 the position of frame 244 can be adjusted in a predetermined manner with all the desired accuracy in relation to the extruder 2, when an adjustment is necessary to take due account of a change in the diameter of the extruded parison. When the frame structure is "floating" on its four air cushions it is only necessary to rotate the adjustment screws 243 for moving the frame structure of the machine to the desired amount, the latter being easily checked by means of the scales carried by plate 247.

Of course, the form of embodiment of the invention which is described hereinabove with reference to the accompanying drawing is given by way of illustration only and should not be construed as limiting the scope of the invention since many modifications may be brought thereto without departing from the basic principles of the invention as set forth in the appended claims.

What I claim is

1. Machine for manufacturing plastic hollow bodies by extrusion-blowing, which comprises a shaft mounted for rotation about a horizontal axis, a support rigid with said shaft, means for rotatably and continuously driving said shaft and said support, an extruder adapted to produce a continuous tubular blank or parison delivered in a vertical direction, a plurality of molds disposed at spaced intervals about the axis of rotation of said shaft, each mold comprising a fixed half-mold and a movable half-mold adapted to be moved parallel to said axis of rotation, double-acting longitudinal pneumatic actuators of the cylinder-and-piston unit type, carried by said rotary support and associated with the different molds respectively, each actuator comprising a piston forming in said actuator two chambers, namely a front mold-opening chamber and a rear mold-closing chamber, and a rod rigid with said piston and extending through said actuator, said movable half-mold being secured to a first or front end of said rod, a fixed transverse plate centered to said axis of rotation of said mold support and disposed behind said pneumatic actuators, an opening ramp and a closing ramp carried by said fixed transverse plate and extending along circular arcs centered to said axis of rotation, rollers carried by the rear ends of the rods of said pneumatic actuators, said rollers engaging said opening and closing ramps, a programmer rotatably solid with said mold support and comprising, for each mold, a group of associated pneumatic valves including an opening valve and a closing valve connected to the front opening chambers and to the rear closing chambers respectively of the associated pneumatic actuators, and a fixed mold opening cam and a fixed mold-closing cam acting upon said mold opening and closing valves, respectively, during the rotation of said mold support, said opening and closing cams being so disposed, in relation to the relevant opening and closing ramps, that when the fixed mold-opening cam controls the opening of a pneumatic opening valve associated with a given mold the roller carried by the rod of the pneumatic actuator associated with this mold is urged against a curved portion of the opening ramp defining the mold opening law, and that similarly, when the fixed closing cam causes the opening of the closing valve associated with a mold the roller carried by the rod of the pneumatic actuator associated with the mold is urged against the curved portion of the closing ramp defining the mold closing law.

2. Machine according to claim 1, comprising, for each mold, a first pneumatic pipeline connecting the front opening chamber of the pneumatic actuator associated with this mold to the pneumatic opening valve of said programmer, a first circuit selector interposed in said first pneumatic pipeline, a second pneumatic pipeline connecting the rear closing chamber of said pneumatic actuator to the pneumatic closing valve and a second circuit selector interposed in said second pneumatic pipeline, each one of said first and second circuit selectors comprising an orifice permitting of connecting a compressed-air injection nozzle for manually controlling the mold opening and closing movements.

3. Machine according to claim 1, comprising a substantially semicylindrical skirt rigid with said fixed transverse plate and having secured thereto the aforesaid opening and closing ramps, and wherein said opening and closing ramps comprise, in developed view and as seen from the roller inlet end to the roller outlet end, a first pair of rectilinear transverse edges between which each roller is adapted to be engaged, then a second pair of curved edges inclined to the rear, then a third pair of rectilinear transverse edges, said closing ramp ending with a fourth curved edge inclined in the forward direction and connected to a fifth rectilinear transverse edge, the shapes of said second curved and rearwardly inclined edge of said opening ramp and said fourth curved and forwardly inclined edge of said closing ramp being such that the longitudinal accelerations impressed to said rollers as a consequence of the law of motion defined by said curved edges be zero at the points where said edges merge into the adjacent rectilinear transverse edges and into the points of inflexion of the curved edges, the fourth curved edge of the closing ramp having a point of inflexion at the point engaged by said roller when the movable half-mold engages said parison.

4. Machine according to claim 1, comprising openings formed in said fixed transverse plate supporting the closing and opening ramps to permit an easy access from the rear of the machine to the pneumatic valves of said programmer.

5. Machine according to claim 1, comprising bearings disposed centrally of said fixed transverse plate carrying the closing and opening ramps, the shaft rigid with said mold support being rotatably mounted in relation to said transverse plate through the medium of said bearings.

6. Machine according to claim 1, comprising, for each mold, a first plate secured to the front end of the rod of the associated pneumatic actuator and to which the movable half-mold is mounted, and a longitudinal block rigid with said rotary support, for guiding said mold-supporting plate during its longitudinal sliding movement.

7. Machine according to claim 6, comprising a second transverse plate forming an integral part of the rotary mold support and carrying all the fixed half-molds, and, for a mold, two anchor lugs secured to the two lateral faces of the first plate carrying the movable half-mold, respectively, the front ends of these anchoring lugs constituting hornlike projections of greater width, a pair of upper and lower hooks mounted on the second plate carrying the fixed half-molds, on either side of each fixed half-mold, each pair of said upper and lower horns registering with an anchor lug of the corresponding movable half-mold, the upper and lower hooks of each pair being pivotally mounted to said second plate, said hooks comprising on the rear side of said second plate, curved rear ends bearing against the edge of the horn of the associated anchoring lug, in the closed-mold position, for locking the relevant mold, a slot formed in said second movable half-mold supporting plate and through which extend the upper and lower hooks of a same pair, a pneumatic actuator for locking and releasing the mold, said actuator being disposed on the front side of said second plate carrying the fixed half-molds, each pneumatic locking and release actuator acting upon the front ends of a pair of upper and lower hooks, whereby the stroke of the rod of said actuator in one direction causes the movement of the rear curved ends of said upper and lower hooks away from each other and therefore the release of the relevant mold. the stroke in the opposite direction of the rod of said actuator causing the movement of the curved rear ends of said hooks towards each other for clamping therebetween the associated anchoring horns and thus lock the mold in its closed position.

8. Machine according to claim 7, which comprises, for each mould, first and second pneumatic locking and release actuators controlling first and second pairs of upper and lower hooks respectively, locking pipe lines connected to first chambers of said pair of pneumatic locking and release actuators, release pipelines connected to said second chambers of said pair of pneumatic locking and release actuators, a pneumatic locking valve and a pneumatic release valve forming part of said programmer and connected to said locking and release pipelines respectively, a pneumatic distributor connected between said pneumatic locking valve and said locking pipeline, said pneumatic distributor comprising an inlet directly connected to said locking valve, a first control inlet directly connected to the inlet of said distributor and a second control inlet, a manually operated monitoring valve inserted between said second control inlet and the distributor inlet, a lever for controlling said monitoring controlling said monitoring valve, a masking member rigid with the rod of said pneumatic mold-opening and closing actuator and adapted to receive said monitoring-valve control lever, and an opening formed in said masking member and so positioned that said opening registers with said monitoring-valve control lever only when said mold is in its closed position.

9. Machine according to claim 1, which comprises, for each fixed and movable half-mold, a mold carrier plate secured in turn to a corresponding supporting plate, first holes formed in said mold carrier plate, first screws extending through said holes for securing said half-mold to said mold carrier plate, second holes formed through said mold carrier plate, nuts and second screws housed in said second holes for securing said mold carrier plate to its supporting plate, ducts formed in said mold carrier plate, first orifices formed in a first face of said mold carrier plate which contacts said supporting plate, said orifices communicating with said ducts, second orifices formed in said supporting plate which register with said first orifices formed in said first face of said mold carrier plate and are intended for the circulation of cooling water and possibly for supplying compressed air, and third orifices formed in said second face of said mold carrier plate which contacts said half-mold and communicates with said ducts for transmitting cooling water and possibly compressed air within said half-mold.

10. Machine according to claim 9, in which said plate carrying the movable half-mold comprises two longitudinal ducts formed within said plate and communicating respectively with a first pair of orifices of relatively large diameter formed in the first face of said mold carrier plate for the ingress and exhaust of cooling water, said two longitudinal ducts also communicating with third orifices of smaller diameter formed in the second face of said mold carrier plate.

11. Machine according to claim 9, wherein the plate carrying the fixed half-mold has formed therein a pair of longitudinal ducts communicating respectively with first orifices of relatively great diameter formed in the first face of said mold carrier plate and also with third orifices of smaller diameter formed in the second face of said plate, said mould carrier plate further comprising a third longitudinal duct, a fourth compressed-air inlet orifice communicating with said third longitudinal duct and formed in the first face of said mold carrier plate, and a fifth compressed-air exhaust orifice formed in the second face of said mold carrier plate and located beneath half-mold fixed half-mold in order to supply compressed air to a pneumatic sprue-removing device.

12. Machine according to claim 1, comprising a hydraulic motor, an output shaft of said hydraulic motor rotatably driven therefrom, first and second sprockets rotatably solid with said output shaft of said hydraulic motor, first and second chain wheels, one chain wheel being rigid with the machine shaft while the other chain wheel is mounted for loose rotation on said shaft, first and second endless chains operatively connecting said first sprocket to the first chain wheel and said second sprocket to said second chain wheel, respectively, a chain tensioning device adapted to couple said chain wheels and tending to pivot said chain wheels in opposite directions, a brake adapted to act upon said shaft of said hydraulic driving motor, and a brake actuator controlling said brake.

13. Machine according to claim 12, which comprises a hydraulic feed system associated with said hydraulic motor for driving the machine, said system comprising an oil reservoir, a constant output pump taking oil from said reservoir and forcing same towards said hydraulic motor, a first spring-loaded valve for returning the excess oil to the reservoir and, downstream of said hydraulic motor, an output regulator for adjusting the motor speed, a distributor adapted to open or close said hydraulic circuit for the electric ON-OFF control of the machine, and a second spring-loaded valve branched off said output regulator and said ON-OFF control distributor.

14. Machine according to claim 13, comprising a pneumatic distributor including a hydraulic control inlet and two outlets to which the actuator controlling the brake associated with the shaft of said hydraulic motor is connected, a source of compressed air connected to said pneumatic distributor, a hydraulic valve having its inlet connected to the pipeline supplying hydraulic fluid to said hydraulic motor and its outlet connected to the control inlet of said pneumatic distributor, said hydraulic valve being normally closed when the machine is inoperative, and electric control means for opening said hydraulic valve when starting the machine.

15. Machine according to claim 1, which comprises a frame structure carrying the rotary mold support, a plurality of feet through which said frame structure bears on the floor, each foot comprising a show shoe and a vertically adjustable rod rigid with said frame structure, said shoe being also rigid with said rod, a duct formed through said shoe, a source of compressed air, a flexible house connecting said source of compressed air to said duct, a resilient pad on the floor and a base member bearing upon said resilient pad to permit the production of an air cushion between said shoe and said baseplate.

16. Machine according to claim 15, which further comprises at the extruder's frame structure a pair of horizontal brackets rigid with said last-named structure at the lower portion thereof, vertical wings constituting the extensions of said horizontal brackets, a pair of frames carried by said structure and adapted to receive said vertical wings in central recesses, and adjustment screws extending through the sides of each frame and engaging with their ends the faces of the vertical wings of said brackets, for adjusting the position of the frame structure of the machine in relation to the frame structure of said extruder when said machine frame structure is floating on said air-cushions.